United States Patent
Cok

(10) Patent No.: US 7,417,627 B2
(45) Date of Patent: Aug. 26, 2008

(54) SENSING DISPLAY

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 611 days.

(21) Appl. No.: 10/974,076

(22) Filed: Oct. 27, 2004

(65) Prior Publication Data

US 2006/0098004 A1 May 11, 2006

(51) Int. Cl.
*G09G 5/00* (2006.01)
(52) U.S. Cl. .................................... 345/173; 345/156
(58) Field of Classification Search ......... 345/156–173; 178/18.01, 18.07, 18.02, 18.03; 200/512, 200/310; 428/212, 690, 402, 403, 213, 304.4; 73/862

See application file for complete search history.

(56) References Cited

U.S. PATENT DOCUMENTS

| 5,225,166 | A | 7/1993 | Zarian et al. |
| 5,451,723 | A * | 9/1995 | Huang et al. ............. 178/18.04 |
| 6,181,842 | B1 | 1/2001 | Francis et al. |
| 6,351,260 | B1 | 2/2002 | Graham et al. |
| 6,355,895 | B1 * | 3/2002 | Crowley et al. ............. 200/512 |
| 2001/0013861 | A1 * | 8/2001 | Shimizu ..................... 345/173 |
| 2002/0171088 | A1 | 11/2002 | Kahen et al. |
| 2002/0175900 | A1 | 11/2002 | Armstrong |
| 2003/0026971 | A1 * | 2/2003 | Inkster et al. ............ 428/304.4 |
| 2003/0161368 | A1 | 8/2003 | Kahan et al. |
| 2003/0184892 | A1 | 10/2003 | Lu et al. |
| 2004/0140960 | A1 | 7/2004 | Cok |
| 2004/0140961 | A1 | 7/2004 | Cok |
| 2005/0057528 | A1 * | 3/2005 | Kleen ......................... 345/173 |

* cited by examiner

*Primary Examiner*—Nitin Patel
(74) *Attorney, Agent, or Firm*—Roland R. Schindler; Mark G. Bocchetti

(57) ABSTRACT

A display and method for making the same are provided that can sense a force applied thereto. The display comprises a substrate, an array of individually controllable image-forming elements arranged on the substrate; and a support located proximate to the substrate. The support has an arrangement of light paths formed therein to transmit light from a light source to a light sensor. The light paths are arranged in an area that is, at least in part, co-extensive with the array. The support is elastically deformable so that an application of force to the support causes the light paths to deform in a manner that reduces the portion of light passing through light paths elastically deformed by the application of force.

34 Claims, 18 Drawing Sheets ically deformable by the application of force.

SENSING DISPLAY

FIELD OF THE INVENTION

This invention relates generally to information displays and, more particularly, to an information display with an integrated touch screen capability.

BACKGROUND OF THE INVENTION

Modern electronic devices provide an increasing amount of functionality with a decreasing size. By continually integrating more and more capabilities within electronic devices, costs are reduced and reliability increased. Touch screens are frequently used in combination with conventional soft displays such as cathode ray tubes (CRTs), liquid crystal displays (LCDs), plasma displays and electroluminescent displays. The touch screens are manufactured as separate devices and mechanically mated to the viewing surfaces of the displays.

Several examples of such touch screens are known, U.S. Patent Publication No. 2002/01759001A1 by Armstrong, published Nov. 28, 2002, describes a touch system for use with an information display system including a frame defining an opening corresponding in size and shape to an information display area of a display. On each side is positioned an array of light-emitting devices with a light-transmissive prism positioned along each array of light-emitting devices such that light emitted from the light-emitting devices is directed across the touch input area. The system also includes light detection devices positioned at each corner of the frame. In a preferred embodiment, the light-emitting devices are organic light-emitting diodes.

U.S. Pat. No. 6,351,260 B1, entitled "User input device for a computer system" filed by Graham et al and issued on Feb. 26, 2002 describes a user input device for an electronic device. The user input device provides positional information using a grid of light. The grid of light is produced from a light source and waveguides. The grid of light is also received and processed using waveguides and a light detector. In this patent, the wave-guides separate light from the light source into a plurality of different light beams that form the grid of light. Light sensors detect when a user positions a finger or other indicator in a location that interrupts the light beams. Optionally, optics may be used to enhance the operation of the user input device.

U.S. Pat. No. 6,181,842, entitled "Position digitizer waveguide array with integrated collimating optics" filed by Francis et al. and issued on Jan. 30, 2001 describes a similar system. In the system of the '842 patent an XY position digitizer is provided that has an X send substrate with an associated X receive substrate, and a Y send substrate with an associated Y receive substrate, defining free space region therebetween. Send waveguides are embedded in the X send substrate and send waveguides are embedded in the Y send substrate. The send waveguides send an array of send light beams across a free space region to the X receive substrate. The send waveguides likewise sends an array of send light beams across the free space region to the Y receive substrate. Receive waveguides are embedded in the X receive substrate and receive waveguides are embedded in the Y receive substrate in correspondence with the X and Y send waveguides. Each receive waveguide receives at least a portion of the light beam from the corresponding send waveguide. An array of X send optical systems are embedded in the X send substrate. One send optical system is in precise optical alignment with each send waveguide for enhancing the collimation of the constrained send light from that aligned send waveguide.

When such touch screens are used with a display, the touch screens are simply placed over the display and the two are held together by a mechanical mounting means such as an enclosure. These prior-art arrangements combining touch screens and displays suffer from a variety of drawbacks. These drawbacks include, but are not limited, to the increased parts count, weight, and cost of the device created by the use of the frame and the presence of redundant components in the display and touch screen. Such prior-art arrangements also increase the thickness of the combination of the touch screen and display as the combination requires that the light sources and light guides project above the surface of the display. Further, there is a risk that the light sources or light receivers can become blocked or contaminated by environmental matter, and thus yield false results. Further, such light guides are capable only of detecting whether a light path has been fully interrupted and are not capable of sensing interruptions in a way that allows for a variable input to be made.

Thus, there remains a need for an improved touch screen and display system that minimizes device weight, removes redundant materials, decreases cost, eliminates special mechanical mounting designs, increases reliability, and minimizes the degradation in image quality.

SUMMARY OF THE INVENTION

A display and method for making the same are provided that can sense a force applied thereto.

In one aspect of the invention, the display comprises a substrate, an array of individually controllable image-forming elements arranged on the substrate; and a support located proximate to the substrate. The support has an arrangement of light paths formed therein to transmit light from a light source to a light sensor. The light paths are arranged in an area that is, at least in part, co-extensive with the array. The support is elastically deformable so that an application of force to the support causes the light paths to deform in a manner that reduces the portion of light passing through light paths that are elastically deformed by the application of force.

In yet another aspect of the invention, a display is provided. The display has a substrate layer and a light-emitting and light-sensing layer formed on the substrate layer. The light-emitting and sensing layer have a plurality of individually controllable light emitters some of which are patterned in an array to form a display area and some of which are patterned for use as a light source with the light-emitting and sensing layer further comprising a plurality of individually addressable light sensors. An elastically deformable layer is provided having a plurality of light path channels therein, each adapted to convey at least a portion of the light from one of the light emitters of the light source to one of the light sensors, the elastically deformable layer further being adapted to change the amount of light transmitted in response to deformation.

In still another aspect of the invention a method is provided for forming a display. In accordance with the method, a support is formed by roll molding a patterned layer having a pattern of channels with each channel extending from an input to an output of the support and forming light paths extending along each of the channels from an input to an output and an array of image-forming elements are provided on the support, the elements being adapted for use in generating a contrast pattern to form an image. At least one light source is provided to radiate light into the input end of the channels and a light sensor is provided to receive light that travels to the output end of the channels. The light paths are formed from an elastically deformable material that changes shape to limit light flow through the light paths in response to the application of force to the support.

DETAILED DESCRIPTION OF THE INVENTION

Figure 1:
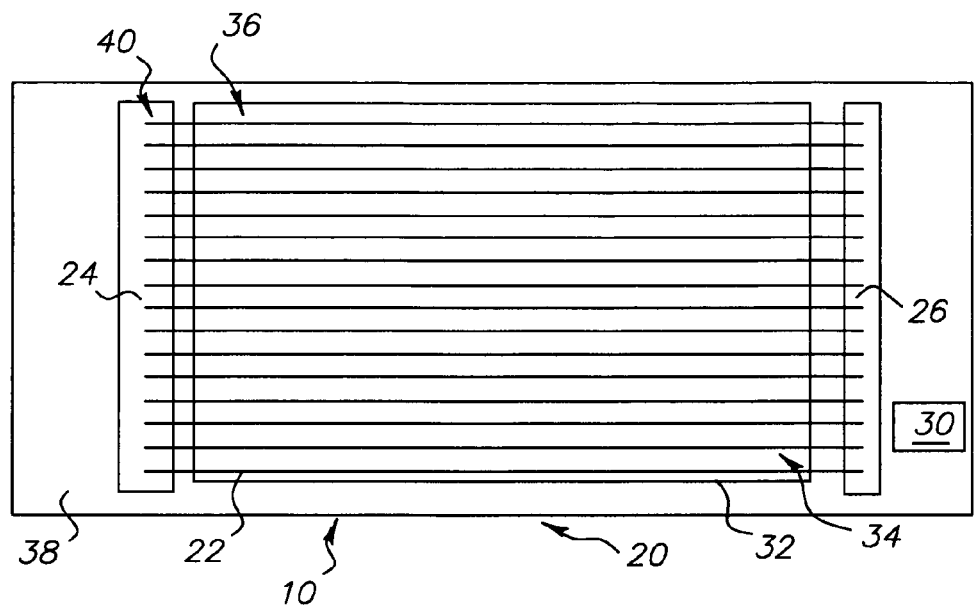
FIG. 1 shows a top block diagram view showing a first embodiment of a sensing display of the invention.
Figure 2:
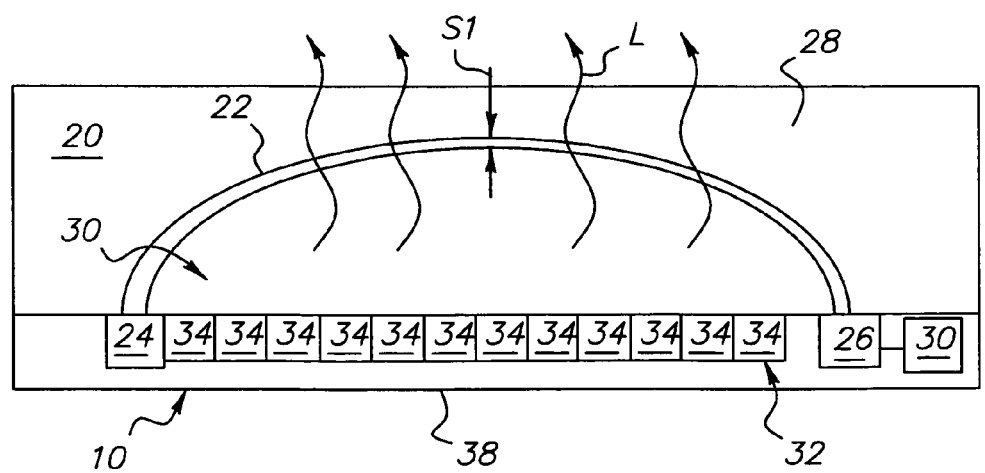
FIG. 2 shows a sectional side view of the embodiment of FIG. 1.
Figure 3:
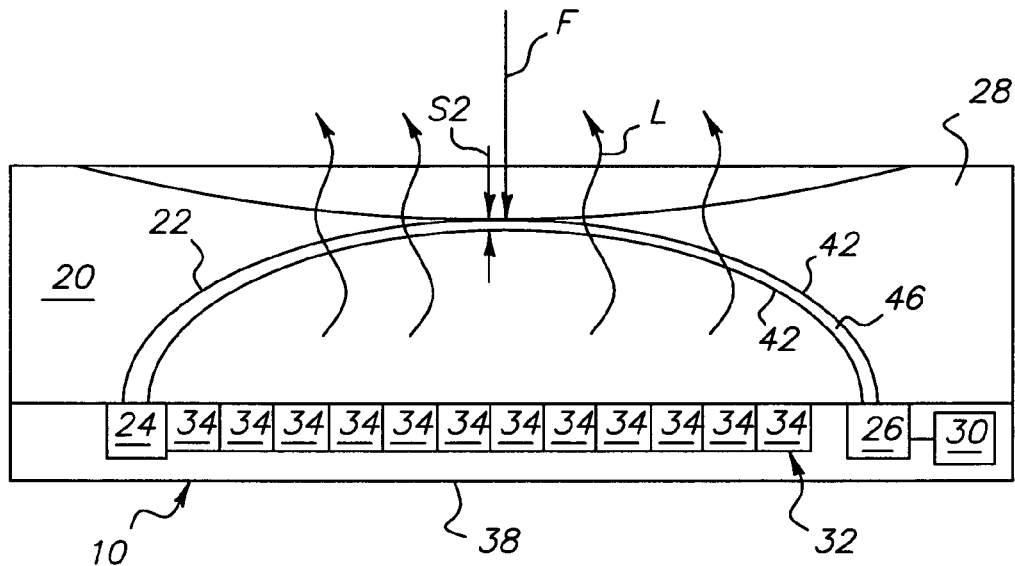
FIG. 3 shows a sectional side view of the embodiment of FIG. 1 with a force applied thereto.

FIG. 1 shows a top view and FIGS. 2 and 3 show sectional side views of one embodiment of a sensing display 10 of the invention. In this embodiment, sensing display 10 comprises a support 20 having an arrangement of light paths 22 formed therein to transmit light from a light source 24 provided proximate to support 20 to a light sensor 26 also provided proximate to support 20. Support 20 is formed from a support material 28. Support material 28 is elastically deformable from a relaxed state shown on FIG. 2 to a range of elastically deformed states, one example of which is shown in FIG. 3.

As is shown in FIGS. 2 and 3, the application of a force F to support 20 causes support material 28 to elastically deform in an area in which force is applied. Light paths 22 are provided so that a force-induced deformation of support material 28 causes deformation of light paths 22 such that the proportion of light that is transmitted from light source 24 to light sensor 26 by the affected light paths 22 is reduced. Light sensor 26 provides differentiable signals indicative of a range of sensed intensities, amounts or other characteristics of light received from light paths 22. Control circuit 30 uses these signals from light sensor 26 to determine whether a force has been applied to support 20 in an area that is proximate to one or more of light paths 22.

As shown in the embodiments of FIGS. 1-3, sensing display 10 further comprises an array 32 of individually controllable image-forming elements 34 arranged in an image-forming area 36 on a substrate 38. Image-forming elements 34 are capable of forming images by creating contrast patterns in light that is visible in the image-forming area 36. Image-forming elements 34 can provide this contrast pattern by controllably emitting different amounts of light, controllably modifying a supplied backlight or controllably reflecting light. Examples of image-forming elements 34 that can provide the contrast pattern by controllable light emission include organic light-emitting diodes and electroluminescent display elements. Examples of image-forming elements 34 that can provide the contrast pattern by modifying a supplied backlight include liquid crystal display elements such as those used in conventional TFT arrays and the like. Examples of image-forming elements 34 that can provide the contrast pattern by selectively reflecting light include liquid crystal display elements and bi-stable type display elements such as cholesteric display elements.

Light paths 22 are applied in a pattern 40 that is at least in part co-extensive with image-forming area 36. This enables sensing display 10 to provide both display capabilities and sensing capabilities in a common area and to thereby reduce the size of a sensing display 10.

FIGS. 2 and 3 illustrate one of a number of ways in which a support 20 can provide light paths 22 that reduce the amount of light that is passed therethrough when a force F is applied to the support. FIG. 2 shows that when no force is applied to sensing display 10, light path 22 defines a path having a first light path size S1. However, as shown in FIG. 3, when a force F is applied to support 20, light path 22 is deformed in a manner that constricts the size of light path 22 to a second light path size S2 that is smaller than first light path size S1. This reduces the proportion of light from light source 24 to light sensor 26.

In other embodiments, light paths 22 are provided so that they can be deformed to reduce the proportion of light reaching light sensor 26 from light source 24 in ways other than reduction of the size of the light path 22. In one example of this type, light paths 22 can be shaped in particular shapes or orientations that facilitate the transfer of light through light paths 22. Light paths 22 are further shaped so that deformation of support 20 and support material 28 reshapes or reorients light paths 22 to shapes or orientations that cause a substantial change in the proportion of light transferred by light paths 22 without necessarily reducing the size of light paths 22.

In this example, light paths 22 can comprise open chambers within support 20 having walls 42 that are adapted to provide generally total internal reflection or other forms of internal reflection so that a substantial portion of light provided by light source 24 to light paths 22 travels to light sensor 26. Techniques for shaping conventional waveguides for total internal reflection or other internal reflection are well known to those of ordinary skill in the art and can be used to help define the shape, orientation, material composition or other features of light paths 22 to facilitate light transfer therethrough.

Figure 4:
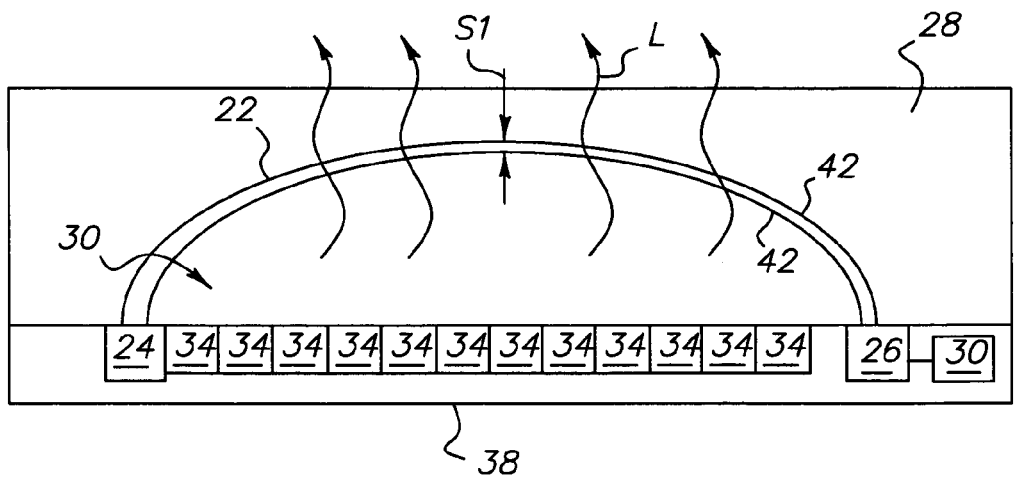
FIG. 4 shows a sectional side view of another embodiment of the sensing display.
Figure 5:
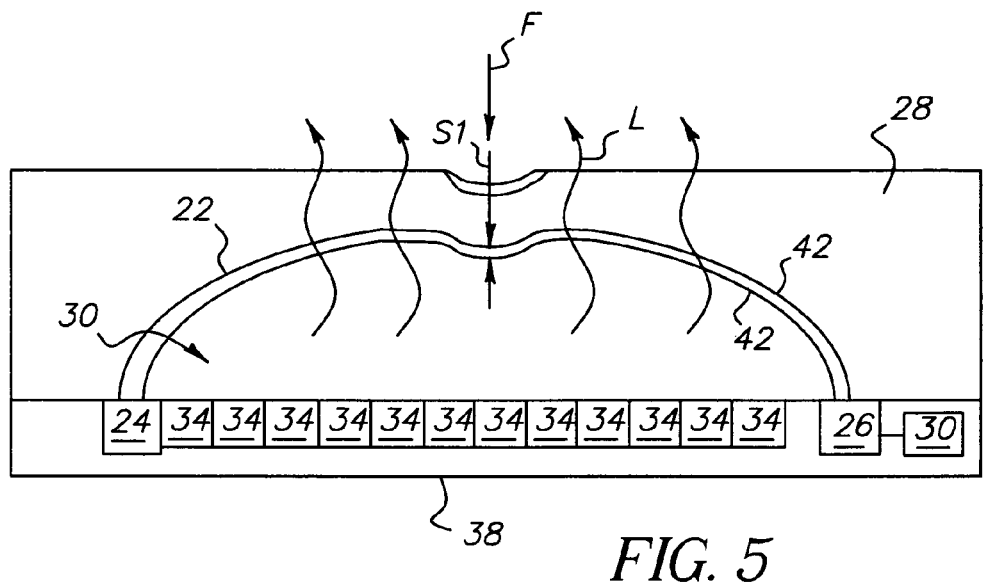
FIG. 5 shows a sectional side view of the embodiment of FIG. 4 with a force applied thereto.

In the embodiment of FIGS. 4 and 5, support 20 is shown formed from a support material 28 that contains one of light paths 22 in the form of walls 42 forming a chamber or open area within support 20. In FIGS. 4 and 5, walls 42 are shaped and arranged in a preferred pattern that avoids rapid changes in the direction that light must travel as it passes through the light path 22. This provides a high degree of efficiency of light transfer from light source 24 to light sensor 26 when light paths 22 are distributed as shown in FIG. 4. In the position shown in FIG. 4, light path 22 has a first light path size S1. However, when a force is applied as shown in FIG. 5, light path 22 changes to a less optimum distribution having changes in direction that are more extreme. This lowers the proportion of light passing through light paths 22 and does so without necessarily adjusting the size of light paths 22. In the embodiment shown in FIG. 5, light paths 22 remain at the first light pipe size S1 in the area in which force F is applied as shown in FIG. 5.

In other embodiments, light paths 22 can be defined so that deformation of light paths 22 can cause light to be deflected out of light paths 22 or deflected back to illumination element 24. Either type of deflection will also result in a change in the proportion of light passing through a light path 22. In other embodiments, other arrangements of light paths 22 are possible that use deformation in other ways to reduce the proportion of light traveling to light sensor 26 when light paths 22 are deformed. It will be appreciated that in various embodiments of the invention, a variety of such techniques can be employed in combination as may be useful in various implementations of the invention.

Although certain embodiments of the invention discussed above have described light paths 22 as being provided in support 20 in the form of chambers, light paths 22 can optionally comprise deposits 54 of a light path material 46. In such embodiments, support 20 is formed generally by depositing a pattern of light path material 46 and depositing support material 28 thereabout. In such embodiments, support material 28 and/or light path material 46 can be defined in a manner that generates desired reflectivity at walls 42, that has a preferred degree of resistance to an applied force F or that otherwise reacts to force F in a preferred way. Details concerning ways in which support 20 and light paths 22 can be made are discussed in greater detail below.

In the embodiment of sensing display 10 shown in FIGS. 1-3, image-forming elements 34 comprise light-emitting type image-forming elements 34. In operation, each light-emitting image-forming element 34 is individually controllable and each can be used to radiate a different amount of light so as to produce a contrast pattern forming an image in image-forming area 36. Support 20 is transparent so that light L from the image formed in image-forming area 36 is visible to a user through support 20.

In the embodiment of FIGS. 1-3 light source 24 is made from the same type of light-emitting type of materials that are used to provide light-emitting type image-forming elements 34 used in this embodiment. Accordingly such a light source 24 can be formed on substrate 38 in the same manner that image-forming elements 34 are formed. Alternatively, light source 24 of FIGS. 1-3 can be formed from a variety of light emissive materials that are different than the materials used for light-emitting image-forming elements. Examples of such materials include light-emitting materials that that are adapted to radiate light in a non-visible wavelength or to emit particular colors of visible light. Such other materials can be formed on substrate 38 or can be separate therefrom.

Further, in the embodiment of FIGS. 1-3, light source 24 comprises a single light source that provides light to each of the light paths 22. In certain embodiments, light source 24 can comprise a plurality of individually controllable light sources. Such a plurality of individually controllable light sources can be individually associated with a set of one or more of light paths 22 so that light having different characteristics can be supplied to different sets of the light paths 22. For example, in one embodiment, light source 24 can have a first portion that is adapted and a second portion with the first portion and second portion providing light having different wavelengths, colors or other characteristics for introduction into a second set of light paths 22.

As noted above, light sensor 26 is provided on support 20 and is positioned to receive light that has passed through light paths 22. Light sensor 26 can comprise a unitary light sensor that receives light from all of the light paths and provides a single output signal from which it can be determined whether a force has been applied to any of light paths 22. Alternatively, light sensor 26 can be adapted to provide an output signal from which it can be determined which light paths 22 have been subject to a force. This can be done, for example, by providing a light source 24 that sends differentiable light signals through separate ones of sets of light paths 22 with light sensor 26 providing an output that is indicative of the differentiable light signals. In another embodiment, this can be done by providing a light sensor 26 that has more than one light sensitive area, each area providing a separate signal characteristic of the light incident thereupon and with each of the more than one light sensitive area being associated with a different set of at least one of light paths 22. Light sensor 26 can comprise an inorganic photovoltaic material such as silicon-based photo converter that, in certain embodiments, can be formed on substrate 38 or support 20 in a thin layer.

Support material 28 and/or light path material 46 optionally can define a light path 22 so that the proportion of light from light source 24 transmitted by light paths 22 to light sensor 26 changes in proportion to the amount of force F applied to support 20. In other embodiments, support material 28 and/or light path material 46 can be chosen so proportion of light from light source 24 transmitted by light paths 22 to light sensor 26 changes in a manner that is not proportional to the amount of force F applied to support 20. For example, light path 22 can provide a step type response to an applied force F so that when force F is applied to support 20 having a range of applied force, little or no change to the light path occurs. In a second, greater range of force applied to support 20 causes a meaningful change to light path 22.

It will be appreciated that, in either approach, proper selection of support material 28 and/or light path material 46 can be used to provide a tuned response to the application of force F to the support 20 so as to provide a sensing display 10 that can provide output signals that are indicative of particular input conditions. It will also be appreciated that the sensitivity of sensing display 10 can also be a function of the shape of light paths 22 with certain light path shapes reacting differently to the application of force to support 20 and that these shapes can also be adapted to provide a tuned response to the application of force F.

Because light paths 22 travel over image-forming area 36 it may be necessary to take care to reduce the impact that light paths 22 and the light traveling therethrough will have on the appearance of images presented in image-forming area 36. There are a variety of ways in which this can be done. As an initial matter the size of light paths 22 is typically made small such as having a cross sectional area on the order of between 10 and 500 square microns. However in certain embodiments light paths 22 can have a size as large as 1 square millimeter or more without meaningfully interfering with the ability of a user to view and appreciate what is displayed in image-forming area 36. Further, light paths 22 can be shaped to minimize the appearance of light paths 22. Finally, as noted above, light source 24 can provide only non-visible light to light paths 22 so that the light passing therethrough does not become deflected and interfere with the appearance of images presented by array 32 of image-forming elements 34.

Figure 6:
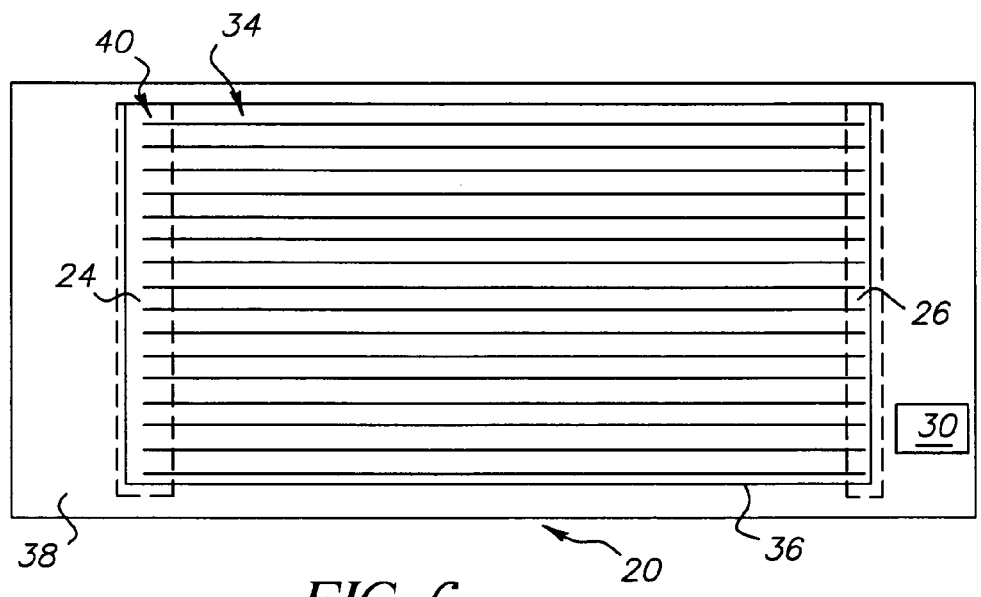
FIG. 6 shows a top view of one embodiment of the with image-forming elements used to provide light to the display.
Figure 7:
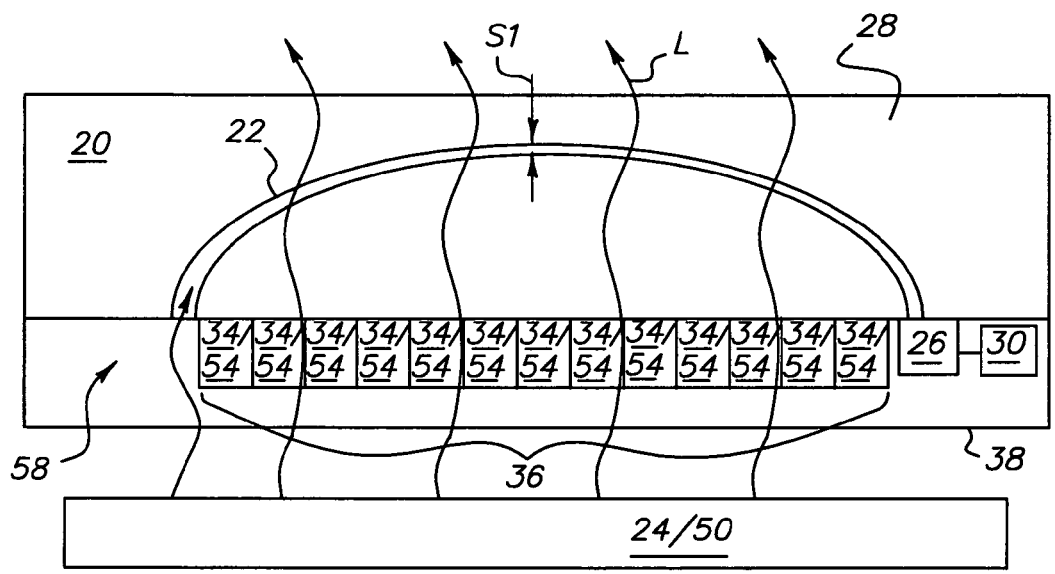
FIG. 7 shows a side view of the embodiment of FIG. 6.

In FIGS. 6 and 7, an embodiment of a sensing display 10 is shown that uses image-forming elements 34 that form an image by controllably modifying light. As is shown in FIGS. 6 and 7, a backlight source 50 is provided. The backlight source 50 provides light L that is selectively modified by light-emitting elements 34 to form images. As is also shown in FIGS. 6 and 7, a portion of the light provided by backlight source 50 is provided to light paths 22, thus allowing backlight source 50 to act as a light source 24.

Figure 8:
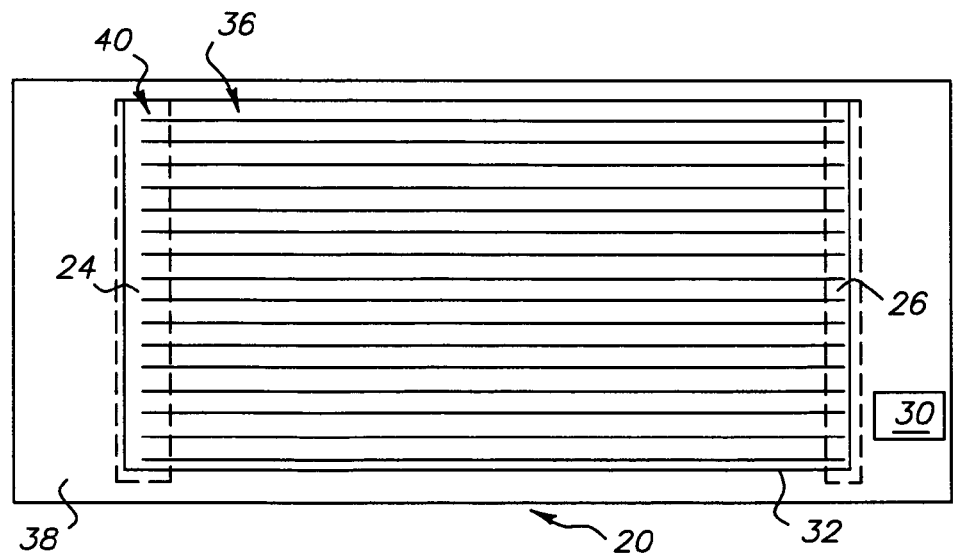
FIG. 8 shows a top view of one embodiment of a display of the invention with image-forming elements used to provide light to the display.
Figure 9:
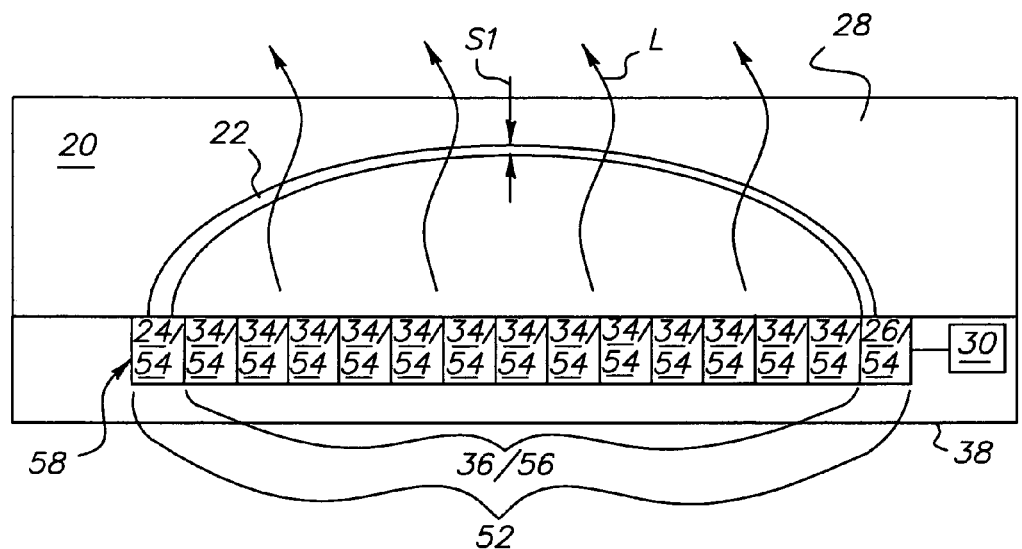
FIG. 9 shows a side view of the embodiment of FIG. 8.

In the embodiment of FIGS. 8 and 9, a matrix 52 of individual addressable deposits 54 of light-emitting material are deposited on substrate 38 that can be used to provide a light source 24 having plurality of individually controllable portions. In this embodiment, array 32 of image-forming elements 34 comprises a first portion 56 of the individually controllable light-emitting elements 32 of matrix 52 and wherein light source 24 comprises a second portion 58 of the individually controllable light-emitting elements 34 of matrix 52. As is shown in FIGS. 8 and 9, the first portion 56 and second portion 58 can be separate. Alternatively, the first and second portions of matrix 52 can be interspersed. This arrangement advantageously can allow the light introduced into each light path 22 to be individually adjusted and controlled in a convenient and cost effective manner as a support 20 can be applied in this fashion to a conventionally formed substrate 38 having such a matrix 52.

It will be appreciated that, in like fashion, a support 20 having light paths 22 can be positioned as shown in FIGS. 8 and 9, in conjunction with sensing display 10 having light modulating image-forming elements 34 such as the one shown in FIGS. 6 and 7 so that backlight provided by backlight source 50 can be modulated as desired before entering light paths 22.

Figure 10:
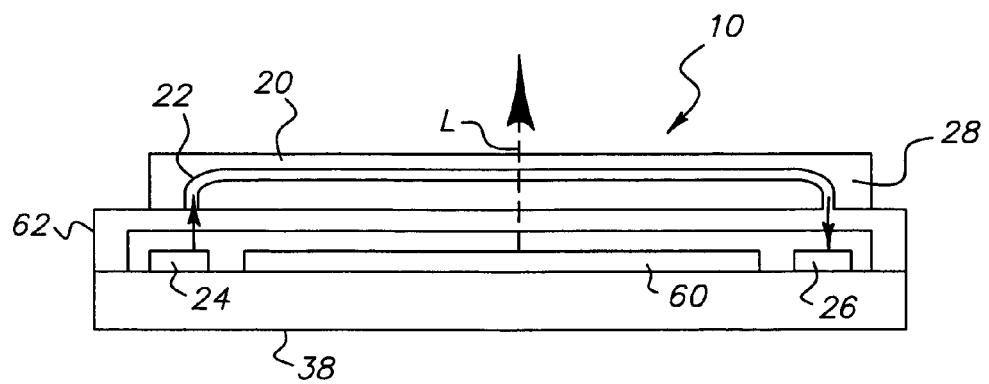
FIG. 10 shows a top view of another embodiment of the invention.

FIG. 10 shows another embodiment of sensing display 10. In this embodiment, sensing display 10 has a support 20, a substrate 38 and an encapsulating cover 62 therebetween. Located on substrate 38 is an OLED display 60 including electrodes and multiple layers of materials such as hole-injection layers and electron transport layers as is well known in the art (not shown). Light L is emitted from OLED display 60 passes through the encapsulating cover 62 or is reflected from substrate 38 and is emitted through the encapsulating cover 62. At one side of substrate 38 is a light source 24 comprising an array of infrared OLED's. Infrared OLED light sources are known and can be made, for example, by doping OLED devices with rare-earth ions such as neodymium or erbium. At the opposite side of substrate 38 is a light sensor 26 comprising an array of infrared light sensors. Light sensor 26 can include filters to improve the frequency response or one or more of the array of infrared light sensors. Such infra-red type sensors can be formed from organic materials, for example OLEDs, or inorganic materials such as silicon, and can be formed in thin-films as is known in the art.

Figure 11:
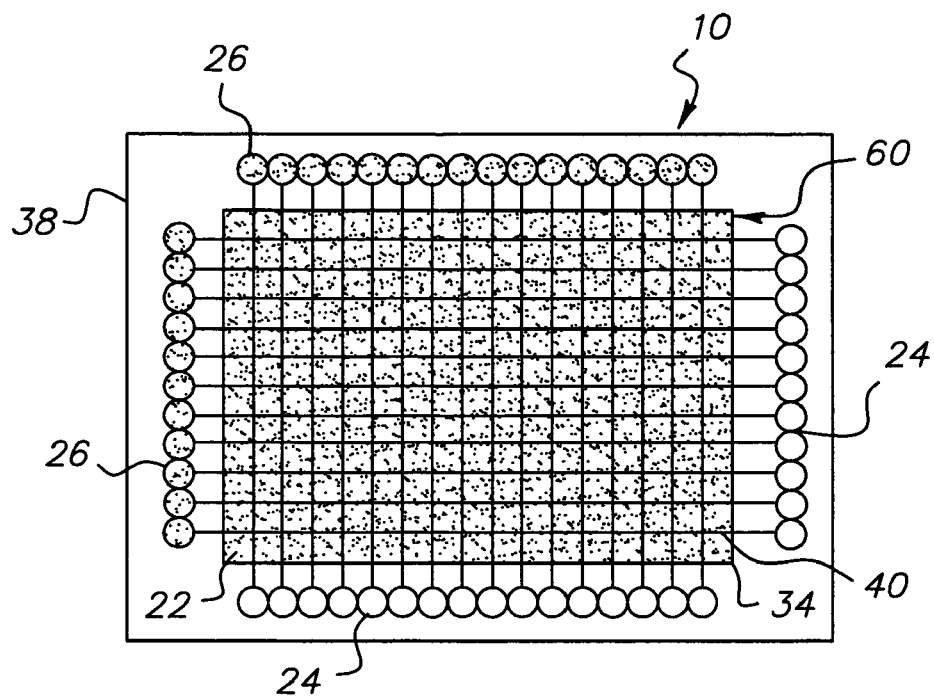
FIG. 11 shows a top view of alternative arrangements of the light sources and sensors.
Figure 12:
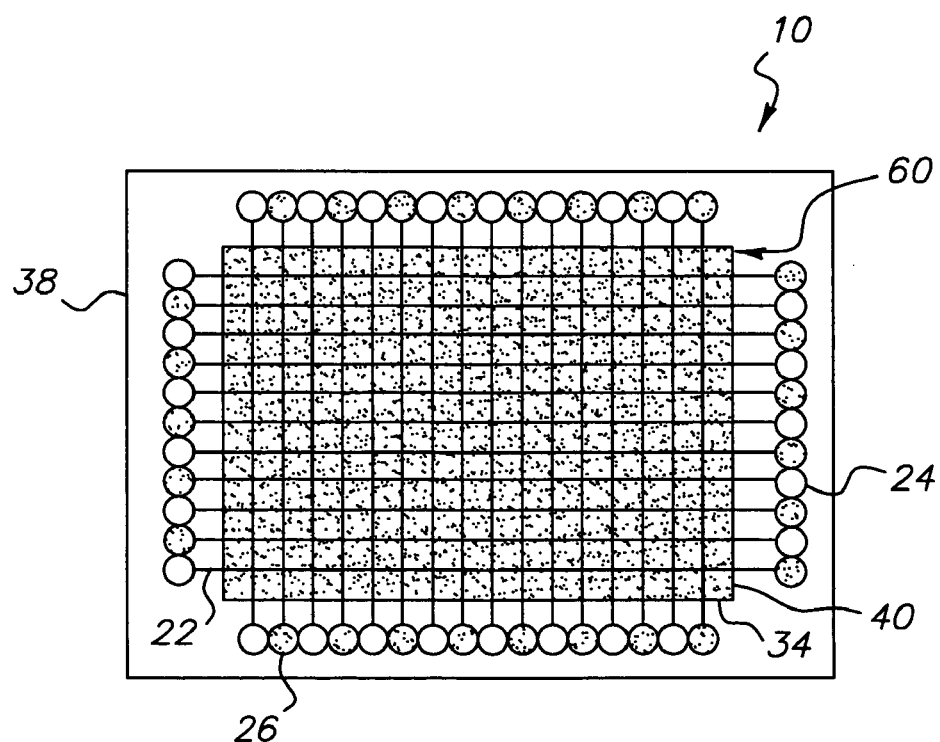
FIG. 12 shows a top view of alternative arrangements of the light sources and sensors.

In the embodiment of FIG. 10, both light source 24 and light sensor 26 are integrated on the same substrate as the OLED display 60. A pattern 40 of light paths 22 is arranged over the encapsulating cover 62 with one end of each light path directly above light source 24 and the other end of light paths 22 directly over a sensor 26. In this embodiment, light paths 22 can be formed of, for example plastic or formed in a support 20 formed from a support material 28 having a lower optical index of refraction than is found within light paths 22. The light paths direct light emitted from the light sources 24 to the light sensors 26. In this embodiment, light paths 22 form a grid pattern 40 across image-forming area 36 of sensing display 10 as shown in FIGS. 11 and 12. Control circuit 30 is connected to sensing display 10 to operate the light sources 24 and sensors 26 and to provide signals that indicates when the light passing from light sources 24 and light sensors 26 changes in quantity, quality or other characteristics.

FIGS. 11 and 12 show top views of alternative arrangements of light sources 24 and light sensors 26. In the arrangement shown in FIG. 1, OLED light sources 24 are located in two arrays adjacent two contiguous edges of display 60 and light sensors 26 are located in two arrays adjacent the other two edges of OLED display 60. In the arrangement shown in FIG. 12, light sources 24 and light sensors 26 are interdigitated in arrays surrounding OLED display 60.

In operation, one or more infrared OLED light sources 24 emit light that is coupled into one or more light paths 22. The light is transmitted through light paths 22 using well-known light piping techniques such as total internal reflection and passes over the surface of the OLED display 60. After passing through the image-forming area of the OLED display 60, the light is guided to light sensor 26. Light sensors 26 detect the light and produce feedback signals that are supplied to control circuit 30 and interpreted in a conventional manner to locate the position of a force applied to support 20. Because sensing display 10 has components that are integrated with substrate 38 having OLED display 60, a single connector may be used for both the sensing function and the display.

In the embodiment shown in FIGS. 10-12, light sensors 26 sense light from the associated light source 24. However, when one or more light paths 22 are compressed, for example by a finger or stylus, the light transmitted through the pipe(s) is attenuated or interrupted by deformation of light paths 22. The change in the amount of light is detected by light sensors 26 associated with deformed light paths 22 and controller 30 detects the application of force to support 20. Light paths 22 are sufficiently close together in each dimension that a single touch will deform at least one light path 22 oriented in each dimension, for example if there are 100 light paths 22 per linear inch. The intersection of the deformed light paths 22 locates the touch. Such an arrangement provides a linear relationship between the touch location and the sensor signal produced by the touch, simplifying the electronic control circuitry.

Any embodiment of light source 24 and light sensor 26 can be energized sequentially or in common to optimize the performance of the sensing display 10 under a wide variety of conditions, including high-ambient light, low-power operation, a noisy environment, or high-performance mode. The emitted light itself may be modulated to overcome background noise or different frequencies of light can be emitted and detected.

Figure 13:
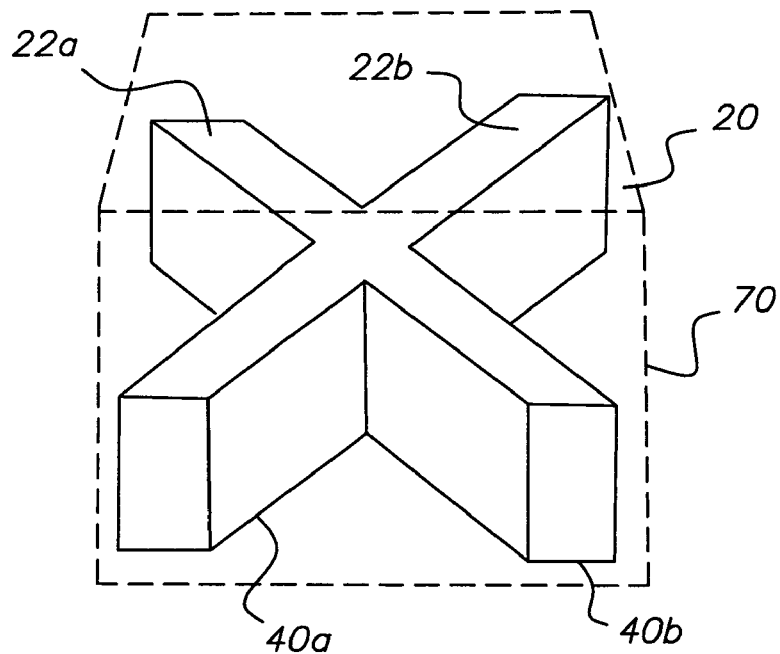
FIG. 13 shows an arrangement of intersecting light paths arranged in a single layer.

There are a variety of ways in which support 20 can provide light paths 22 arranged to allow signals to be generated that permit a control circuit 30 to determine a position of an applied force F. In the embodiment shown in FIG. 13 support 20 forms light paths 22 formed in a common layer 70 so that light paths 22a formed in a first light path pattern 40a physically intersect with light paths 22b formed in a second light path pattern 40b. Such intersection can also be provided in orthogonal directions as shown or non-orthogonal directions. Although some light leakage may be experienced in this configuration, it provides a thin, single layer, and is an easily manufactured structure.

Figure 14:
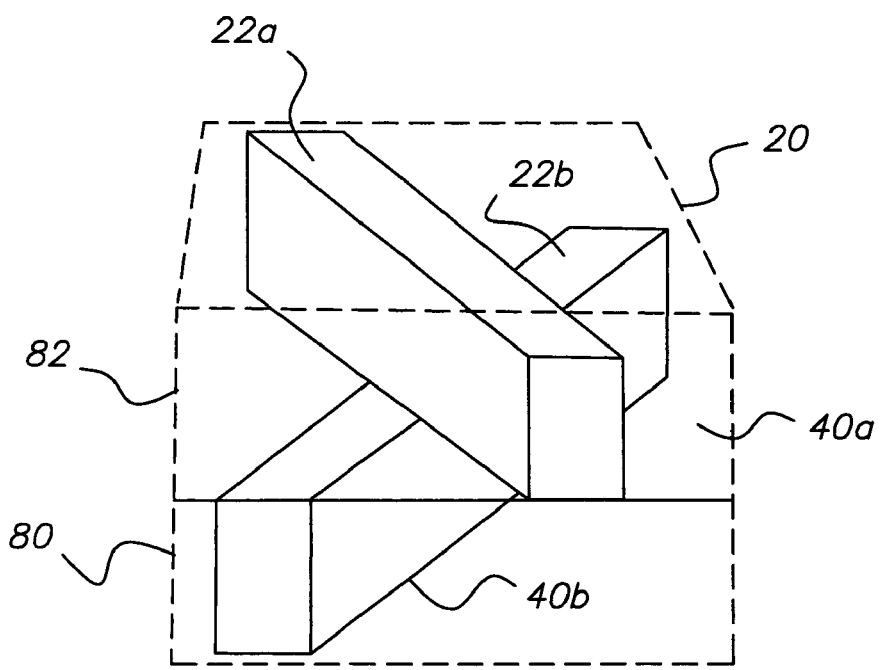
FIG. 14 shows an arrangement of intersecting light paths arranged in multiple layers.

Alternatively, referring to FIG. 14, a support 20 is shown having two layers, first layer 80 and second layer 82. In first layer 80 light paths 22a are oriented in one pattern 40a, and in second layer 82 paths 20 are oriented in a second pattern 40b. In this configuration, layers 80 and 82 can be made separately and combined or formed in a single, thicker sheet.

Figure 15:
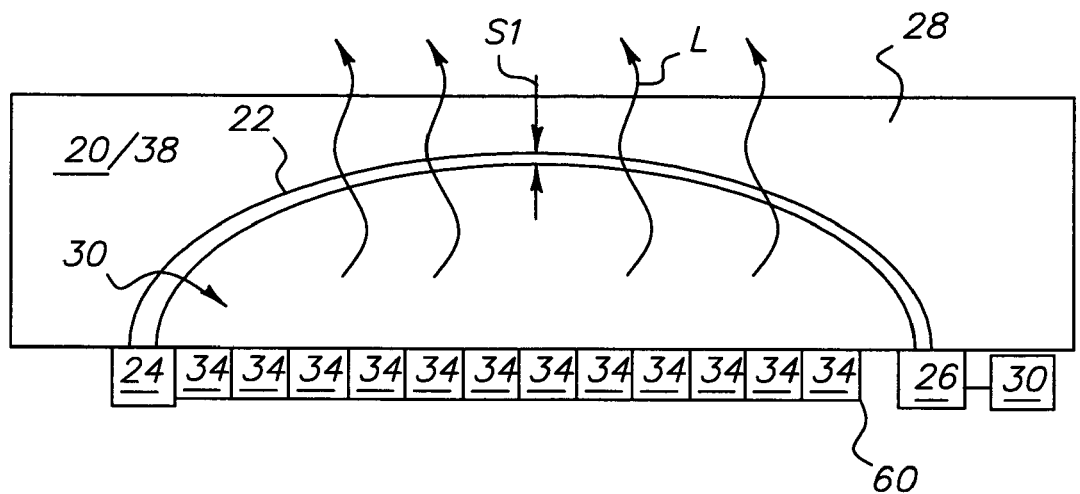
FIG. 15 shows an embodiment of a display of the invention having a support with a light source, image-forming elements, light sensor and a control circuit provided directly thereon.

Referring to FIG. 15, another embodiment of a sensing display 10 is provided. In this embodiment, substrate 38 and support 20 are combined into a single element with support 20 serving as a substrate upon which an OLED display 60 including electrodes and multiple layers of materials such as hole-injection layers and electron transport layers as is well known in the art (not shown). Light L emitted from the display 60 passes through the light paths 22 across and is detected as described above. As shown, light source 24, light sensor 26, and/or control circuit 30 can also be formed on support 20. It will be appreciated that, because this embodiment does not require a separate substrate 38 the weight, size (thickness), and cost of sensing display 10 can be reduced.

Figure 16:
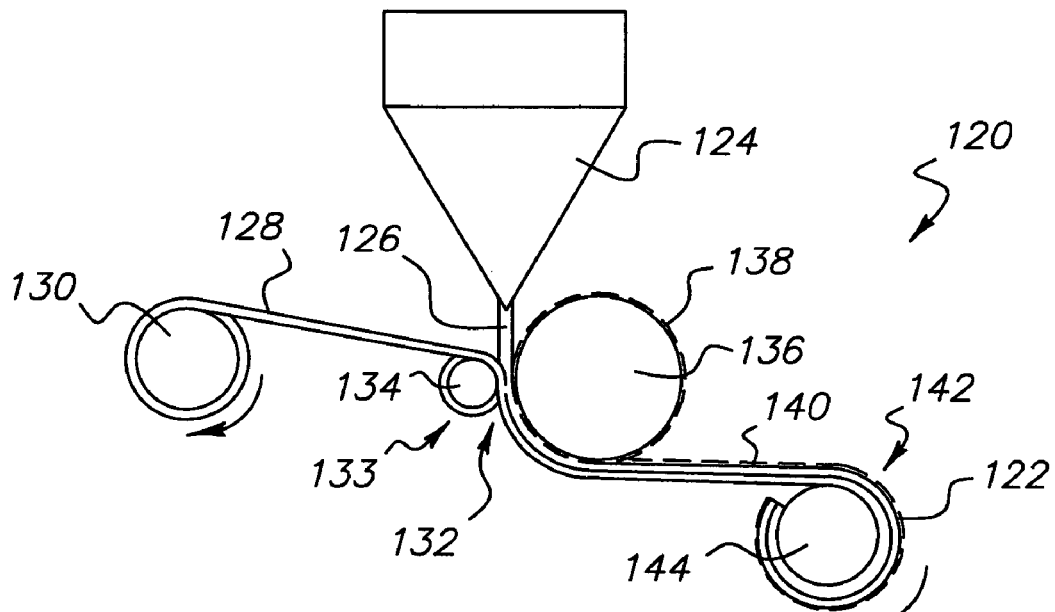
FIG. 16 shows a first embodiment of an extrusion roll molding apparatus.

FIG. 16 shows a schematic illustration of an overall arrangement of one embodiment of an extrusion roll molding apparatus 120 for fabricating a patterned layer 122 useful in forming a support 20. In this embodiment, an extruder 124 provides a thermoplastic material 126, such as a polymer, onto a base material 128 that can be formed from the same material as thermoplastic material 126 or that can be formed from different materials such as papers, films, fabrics or other useful base materials. Base material 128 is fed from a base supply roll 130. Thermoplastic material 126 and base material 128 pass into a nip area 132 between a roller support 133 shown in FIG. 16 as a pressure roller 134 and a pattern roller 136. As thermoplastic material 126 passes through nip area 132, roller support 133 and pattern roller 136 press thermoplastic material 126 onto base material 128 and a roller pattern 138 of raised surfaces and channels (not shown) on pattern roller 136 is impressed into thermoplastic material 126. When roller pattern 138 is impressed into thermoplastic material 126 some of the melted thermoplastic material 126 fills channels (not shown) in roller pattern 138 to form raised areas (not shown) on a patterned surface 142 of patterned layer 122 and the balance of thermoplastic material 126 is squeezed onto base material 128 forming channels (not shown). Accordingly, this forms a channel pattern 140 having channels separated by raised areas on a patterned surface 142 of thermoplastic material 126. The arrangement of raised areas and channels in channel pattern 140 is the negative of the arrangement of raised areas and channels found on roller pattern 138. Thermoplastic material 126 is then cooled below a melting temperature of thermoplastic material 126 or otherwise cured and patterned layer 122 is then wound onto a substrate take up roll 144 for further processing as will be described in greater detail below.

Figure 17:
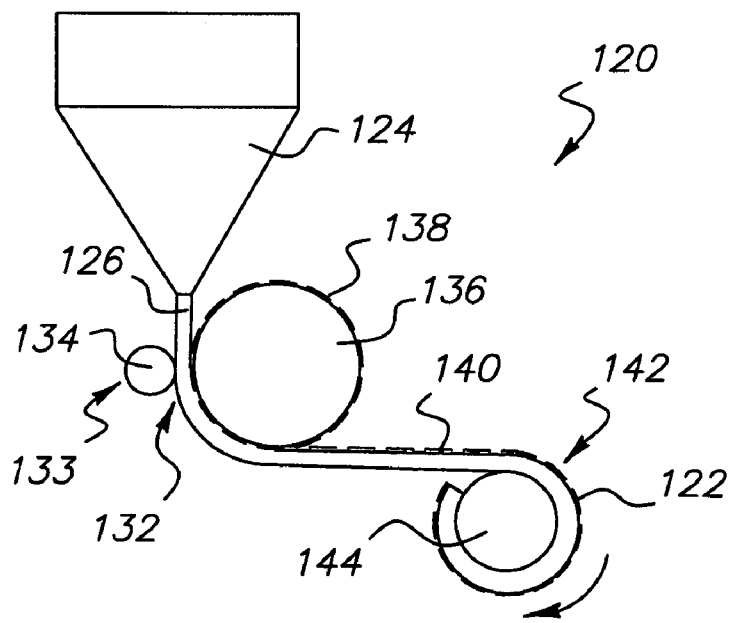
FIG. 17 shows another embodiment of an extrusion roll molding apparatus.

FIG. 17 shows another embodiment of an extrusion roll molding apparatus 120 that can be used to form patterned layer 122 for use in forming support 20. In the embodiment of FIG. 17, extrusion roll molding apparatus 120 comprises an extruder 124 that melts thermoplastic material 126. Melted thermoplastic material 126 supplied by extruder 124 is pressed into nip area 132 between roller support 133 and pattern roller 136. Melted thermoplastic material 126 passes material between roller support 133 and pattern roller 136 and is cooled below the melting temperature of thermoplastic material 126 to form patterned layer 122. As melted thermoplastic material 126 is passed through nip area 132 to form patterned layer 122, a roller pattern 138 on pattern roller 136 is impressed into melted thermoplastic material 126 to form a channel pattern 140 of channels (not shown) separated by raised areas (not shown) on patterned surface 142 of patterned layer 122 that is the negative of pattern roller 136. Patterned layer 122 is then wound onto a substrate take up roll 144 for further processing as will be described in greater detail below.

In the embodiments shown in FIGS. 16 and 17, pattern roller 136 comprises a metallic roller such as chrome, copper or stainless steel into which roller pattern 138 is formed. However, in other embodiments, pattern roller 136 can comprise a variety of forms. For example, pattern roller 136 can comprise any type of dimensionally stable roller, drum, belt or other surface that is adapted so that a metallic plate, sleeve or other structure (not shown) having roller pattern 138 formed thereon that can be joined to pattern roller 136 to provide a metallic contact surface having the desired roller pattern 138. This allows the same pattern roller 136 to be used in conjunction with many different roller patterns simply by changing the sleeve, metallic plate or other structure having roller pattern 138.

Forming roller pattern 138 on a metallic pattern roller 136 or metallic plate, metallic sleeve or other metallic structure that can be joined to pattern roller 136, provides protection to the precision geometry of roller pattern 138, provides excellent mechanical wear properties and is an excellent conductor of heat and pressure. Roller pattern 138 can be formed on pattern roller 136, a plate, sleeve or other structure by known machining techniques, including but not limited to, techniques such as machining the desired pattern directly into the roller surface utilizing wire electrical discharge machining tools, etching the pattern directly into the roller, growing the pattern by use of photolithography, machining the pattern using high energy lasers, diamond milling, ion beam milling or creation of a random pattern by bead blasting the roller followed by chrome plating.

In alternative embodiments, pattern roller 136 or a plate, sleeve or other structure bearing roller pattern 138 can be formed using other non-metallic materials. For example pattern roller 136 can be formed from materials such as ceramics or certain plastics. Roller pattern 138 can be formed in such materials using known techniques including, but not limited to, casting, ablation, ion beam milling, printing and lithographic techniques such as gray scale lithography.

In another alternative embodiment, roller support 133 can take other forms such as a belt, platen or other structure capable of providing sufficient support so that pattern roller 136 can be impressed into thermoplastic material 126 to form channel pattern 140. Similarly, the pattern roller 136 can also alternatively comprise other structures such as a belt, a reciprocating belt system or other movable surface onto which a roller pattern can be formed.

Figure 18:
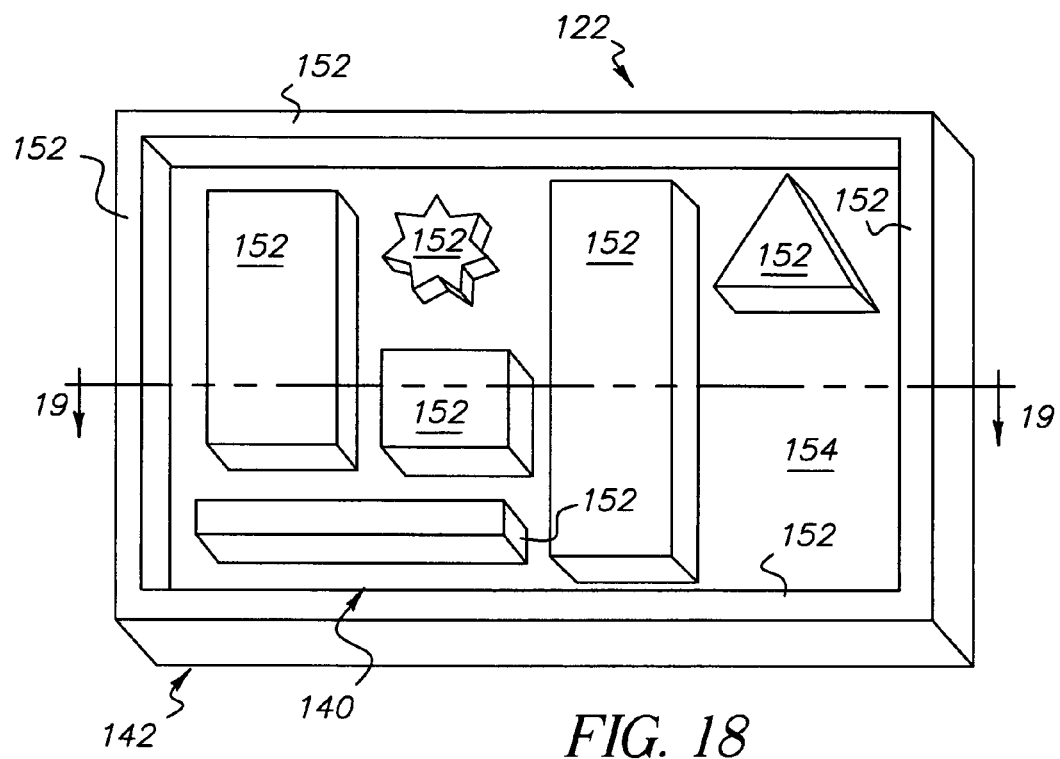
FIG. 18 shows an example of a patterned layer.
Figure 19:
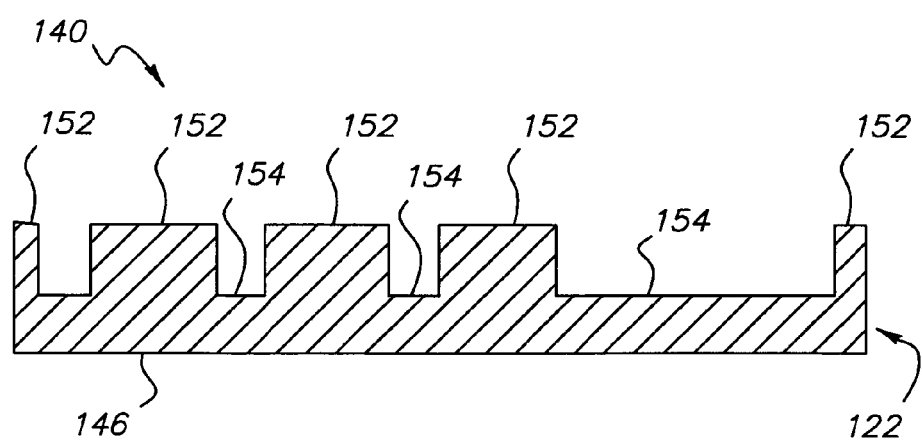
FIG. 19 shows a cross section view of the example patterned layer of FIG. 18.

FIGS. 18 and 19 show, respectively, a perspective and cross-section view of an example of patterned layer 122 formed in accordance with the embodiment of FIG. 17. FIG. 18 shows an example of channel pattern 140 formed on patterned surface 142 of patterned layer 122 by roller pattern 138. As can be seen in FIG. 18, channel pattern 140 can comprise various shapes, sizes and arrangements intended to facilitate particular electrical, magnetic, mechanical, optical or chemical structures as will be described in greater detail below. Raised areas 152 and channels 154 define each shape. FIG. 18 shows examples of only a few of the possible shapes that can be formed on a patterned surface 142 of patterned layer 122. Other shapes include ordered arrays of triangles, continuous fluidic channels, pyramids, squares, rounded features, curved features, cylinders, and complex shapes with multiple sides. In certain embodiments, the separation between raised areas 152 and channels 154 can range from 0.1 micrometers to about 100 micrometers, however, in other embodiments the sizes of the separation can range between 0.5 micrometers and 200 micrometers. It has experimentally been found that such extrusion roll molding processes provides precision negative replication of roller pattern 138. For example, it has been shown that where extrusion roll molding is used to form channel pattern 140 on patterned surface 142 of patterned layer 122, the features of channel pattern 140 typically replicate the dimensions of the features of roller pattern 138 at greater than 95% of the dimensional range. Such precision formation is possible even when forming patterned layer 122 operating at machine speeds in the 20 to 200 meter/min range. Accordingly, it is possible to reliably and economically form precise arrangements of raised areas 152 and channels 154 in patterned layer 122. This allows patterned layer 122 to be used to define a platform for fabricating and assembling a wide variety of useful structures.

Thermoplastic material 126 can comprise a variety of suitable materials. For example, polymers are generally low in cost, and can be efficiently formed into subsequent shapes utilizing known processes such as melt extrusion, vacuum forming and injection molding. Example polymers that can be used for thermoplastic material 126 include polyolefins, cyclo-olefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to can be used to obtain a thermoplastic material 126 having specific mechanical or optical properties. Polyamides that can be used in thermoplastic material 126 include, but are not limited to, nylon 6, nylon 66, and mixtures thereof. Copolymers of polyamides are also suitable continuous phase polymers that can be used in thermoplastic material 126. An example of a useful polycarbonate is bisphenol-A polycarbonate. Cellulosic esters are also suitable for use as thermoplastic material 126 and include cellulose nitrate, cellulose triacetate, cellulose diacetate, cellulose acetate propionate, cellulose acetate butyrate, and mixtures or copolymers thereof. Polyvinyl resins that can be used in thermoplastic material 126 include polyvinyl chloride, poly(vinyl acetyl), and mixtures thereof. Copolymers of vinyl resins can also be utilized.

In addition, thermoplastic material 126 can comprise various known polyesters for the polymer features of the invention including those produced from aromatic, aliphatic or cycloaliphatic dicarboxylic acids of 4-20 carbon atoms and aliphatic or alicyclic glycols having from 2-24 carbon atoms. Examples of suitable dicarboxylic acids include, but are not limited to, terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include, but are not limited to, ethylene glycol, propylene glycol, butanediol, pentanediol, hexanediol, 1,4-cyclohexanedimethanol, diethylene glycol, other polyethylene glycols and mixtures thereof.

Figure 20:
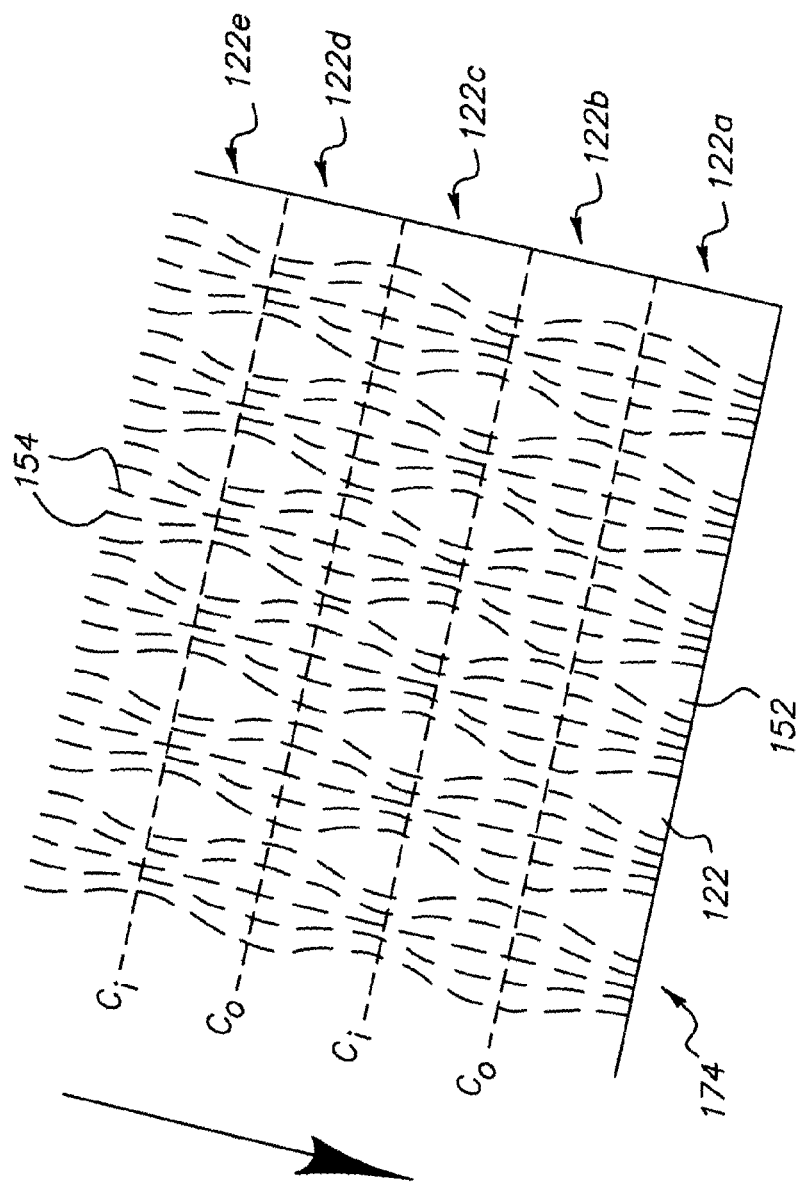
FIG. 20 shows a perspective view of a web having a patterned layer.
Figure 21:
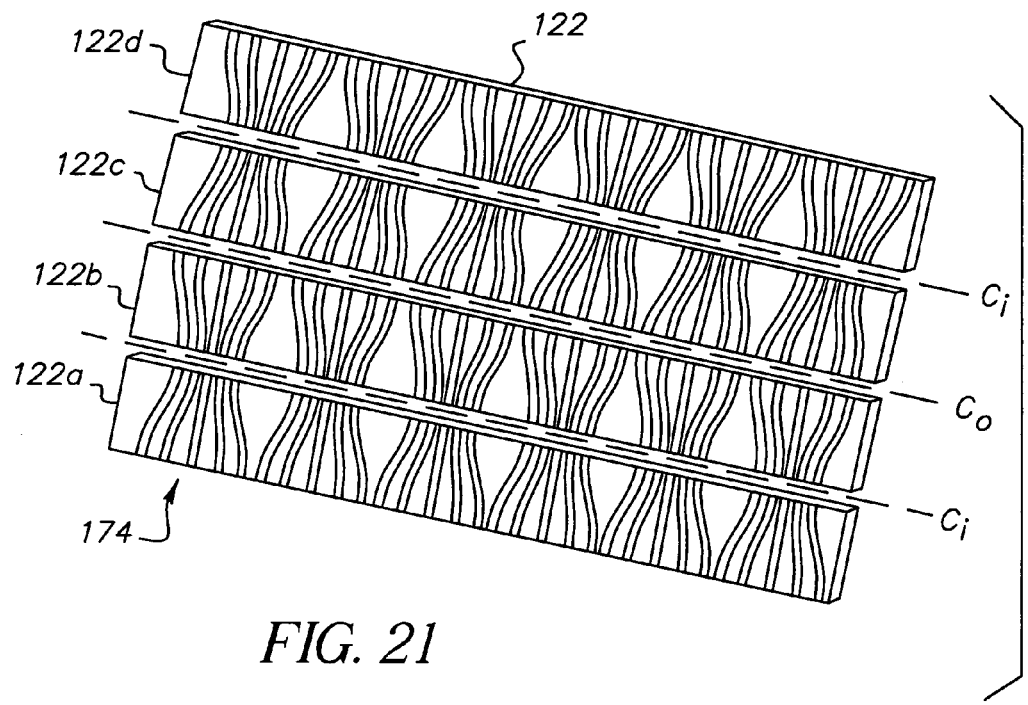
FIG. 21 shows a perspective view of the web of FIG. 20 separated.
Figure 22:
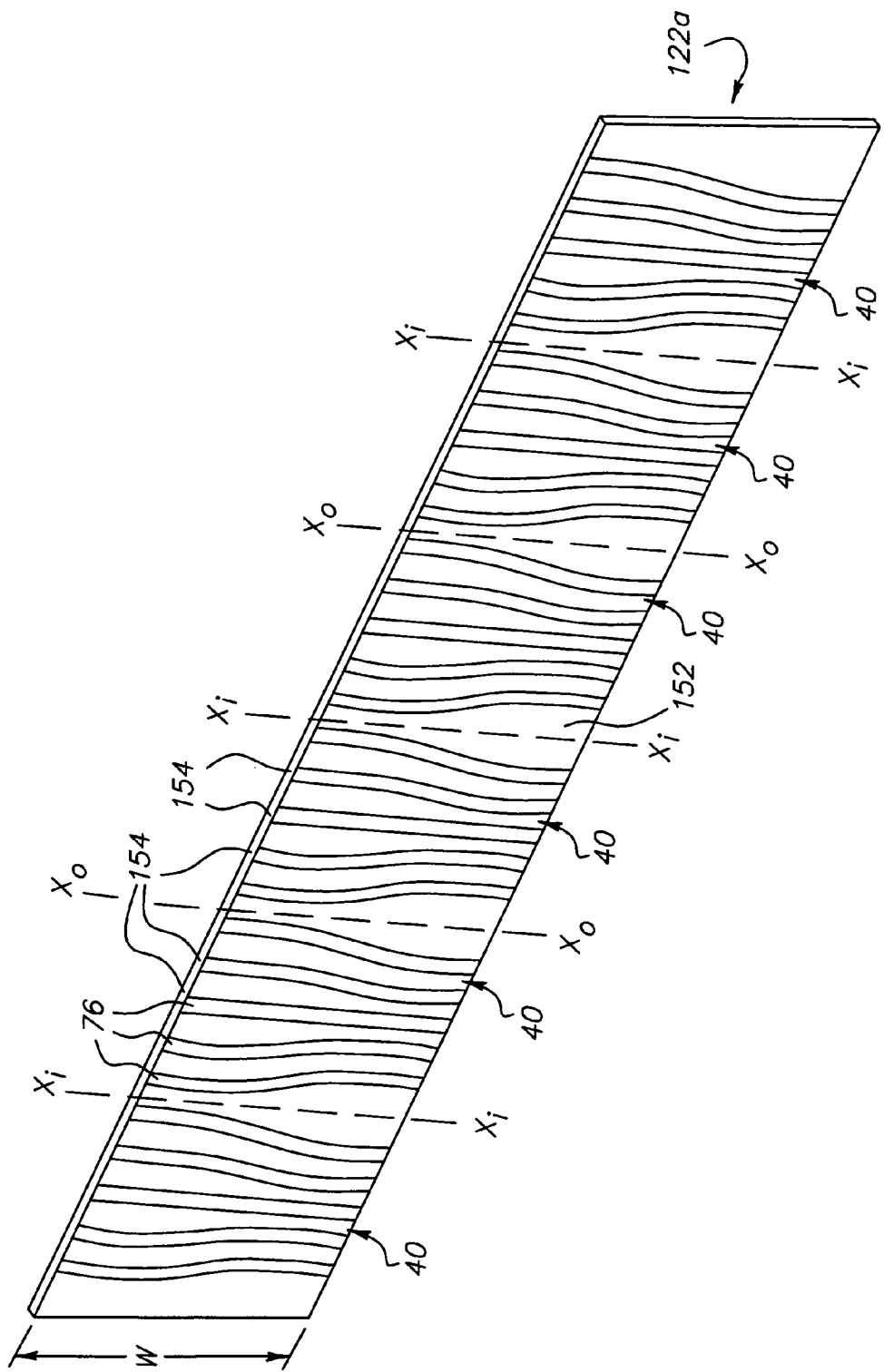
FIG. 22 shows perspective view of a separated portion of the web of FIG. 20.

The use of injection roll molding allows a number of alternative channel patterns 140 to be fabricated in patterned layer 122. FIGS. 20-22 show channels 154 formed generally parallel to the edges of the sheet of patterned layer 122, that is, in a direction parallel to the direction of patterned layer 122 through extrusion roll molding apparatus 120. As is shown in FIG. 20, a web 174 of patterned layer 122 can be formed with multiple copies of a pattern 140 for light paths 22 formed therein arranged for separation along cut lines Ci-Co to form separable patterned layers 122a-122e as illustrated in FIG. 21. As is shown in FIG. 22, pattern layer 122a itself can comprise a plurality of patterns 40 for light paths 22 which can be separated as desired along cut lines Xi-Xo.

For example, channels 154 can be formed in a direction orthogonal to edges of web 174, or at some other angle relative to the edges. Further, the use of extrusion roll molding methods to form patterned layer 122 permits the formation of a web 174 of patterned layer 122 having a length that can be on the order of several meters or more, and which could extend a thousand meters or more. This permits economical bulk fabrication of patterned layer 122.

Figure 23:
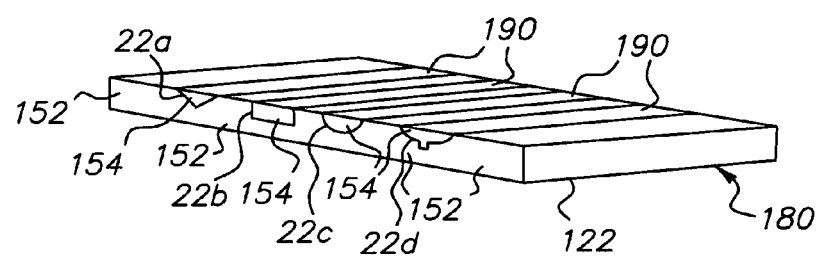
FIG. 23 is a section view showing a patterned layer fabricated with channels for light paths.
Figure 24:
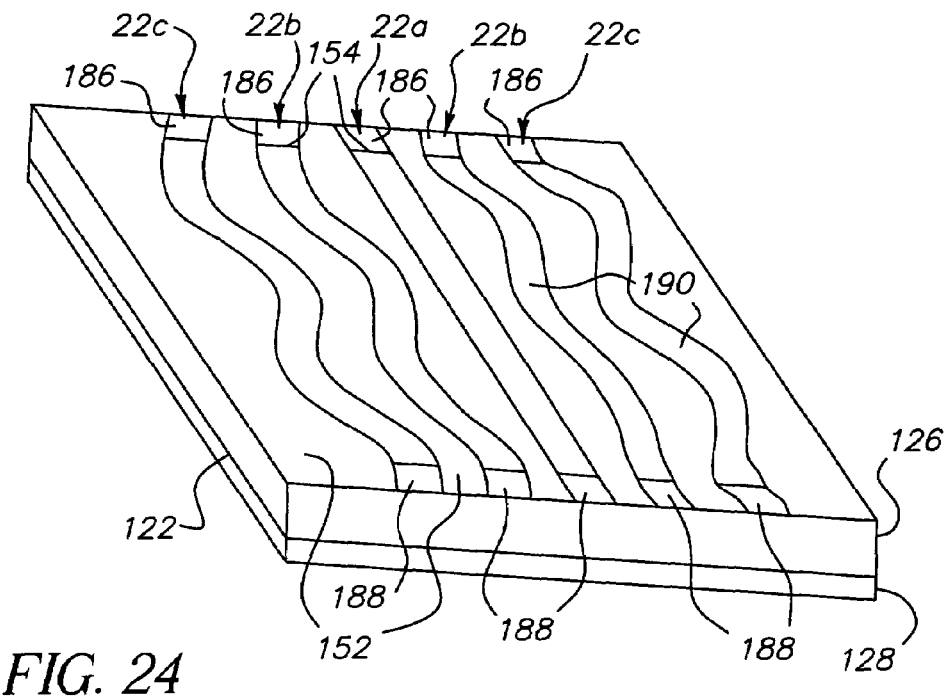
FIG. 24 is a perspective view showing a patterned layer fabricated with channels for light paths structures.

As is shown in FIG. 23, raised areas 152 and channels 154 can have a range of possible cross-sectional shapes, as determined by roller pattern 138 on pattern roller 136 with these cross sectional shapes adapted to receive a curable optical material 190 and to mold curable optical material 190 to form light paths 22 having shapes that conform to shapes of channels 154. Further, as is shown in FIG. 24, the path taken by individual ones of light paths 22a, 22b, and 22c from an input 186 to an output 188 can vary. For example, direct light paths 22a can be provided that move light across a direct path between an input 186 and an output 188, indirect light paths 22b can be provided that move light across a less direct path, and circuitous light paths 22c can also be provided that move light along a more circuitous route.

Figure 25:
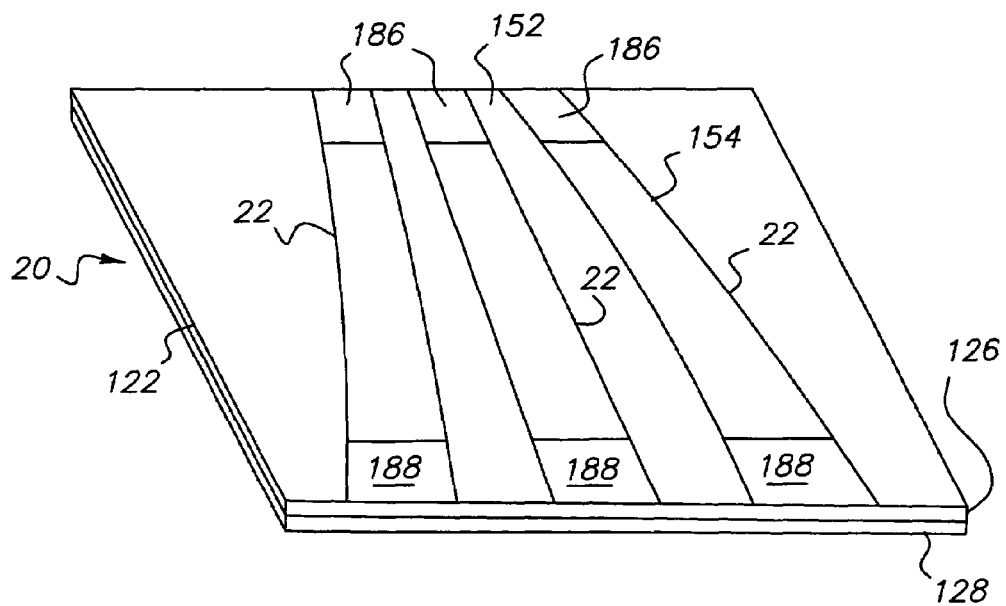
FIG. 25 is a perspective view showing an arrangement of channels and light paths formed within a support according to the present invention.

In addition, fabrication using any embodiment of the extrusion roll molding apparatus 120 allows the dimensions of channels 154 to be controlled at different locations along patterned layer 122, thus allowing a support 20 to be formed with different cross-sectional areas and/or shapes along its length. For example, as is shown in FIG. 25, a support 20 is shown having light paths 22, each having an output 188 that is larger than an input 186. However, this change in size is not necessary.

Application of Optical Material for Forming Light Guides

As noted above, light paths 22 can be formed using patterned layer 122 by applying an optical material 190 to fill or partially fill channels 154 in patterned layer 122. Optical material 190 is typically some type of transmissive material having favorable optical qualities for light transmission and refraction. A variety of such materials can be used for optical material 190. For example, optical material 190 could be a polymer of the type that can be cured as a result of exposure to ultra-violet light, such as Norland Optical Adhesive from Norland Products, Cranbury, N.J. Alternatively, optical material 190 can be formed from a polymeric material, including, for example methacrylates, such as n-butyl methacrylate and 2-ethylhexyl methacrylate. In particular, one suitable optical material includes a 1:1 mixture by weight of n-butyl methacrylate and 2-ethylhexyl methacrylate, which, in turn, can contain 0.05% by weight triethylene glycol dimethacrylate cross-linking agent and 0.2% by weight di(4-t-butylcyclohexyl)peroxydicarbonate (Perkadox 16™, Akzo Nobel Chemicals, Inc., Chicago, Ill.) thermal initiator. Additional materials and examples presented in U.S. Pat. No. 5,225,166 are incorporated herein by reference.

Alternatively, optical material 190 can be selected based upon speed, temperature, thickness, flexibility and other manufacturing or functional requirements. For example, the specific type of optical material 190 then determines the necessary curing time and needed cure conditions, such as heat or light energy. Optical material 190 is typically applied in an amorphous or other state that allows optical material to flow into channels 54 and is curable so that after optical material 190 has filled channels 154, optical material 190 can transition into a state that allows optical material 190 to solidify enough to remain within channels 154 and to provide an efficient and useful optical pathway.

Patterned layer 122 surrounds the optical material 190 and has an index of refraction that is less than the index of refraction of patterned layer 122. Such an arrangement typically results in substantial internal reflection of light traveling through the optical material 190. The internal reflection of light occurs when light traveling down the optical material 190 is reflected back towards the center of optical material 190 as the light encounters an inner surface of patterned layer 122. The efficiency of the optical waveguide decreases if patterned layer 122 is smaller in index of refraction than the optical material 190 by less than 0.05. Patterned layer 122 could have, in another embodiment, a layer of cladding between substrate 38 and optical material 190. This allows more freedom in the polymer or material chosen for the substrate because the cladding has the property of having an index of refraction lower than the optical material and produces the wave guiding effect.

In some embodiments, a cladding (not shown) can be co-extruded with, coated on, or deposited on support 20 adjacent to the light guides to help influence the index of refraction. The cladding can also be a reflective layer. Having a reflective layer (such as metal) surrounding the optical material acts like a mirror and keeps most of the light in the optical material making a very efficient waveguide.

Cladding can be formed from a variety of different compounds. Polymers are preferred as they are cheap and easily processable. As an example, fluoropolymers have been found to be useful as a cladding for the light guiding layer because of their relatively low index of refraction. The larger the difference in index of refraction (with the optical material having a higher index of refraction than the cladding) the more efficient the light guide is and less light is lost.

Figure 26:
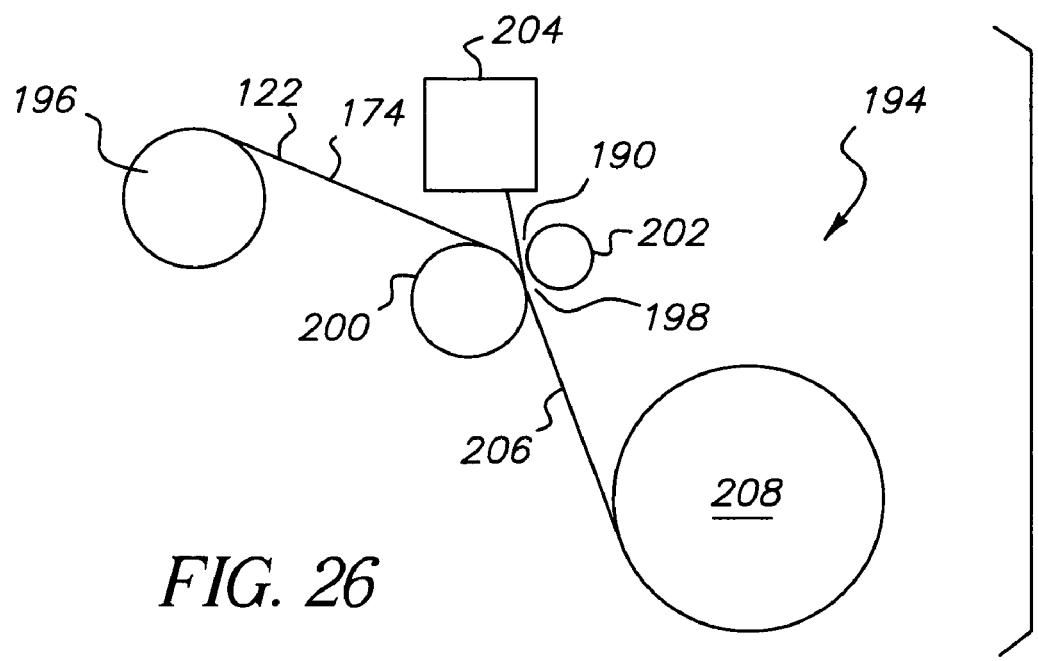
FIG. 26 is a schematic block diagram showing a manufacturing process used to fill channels with an optical material for forming light guides.
Figure 27:
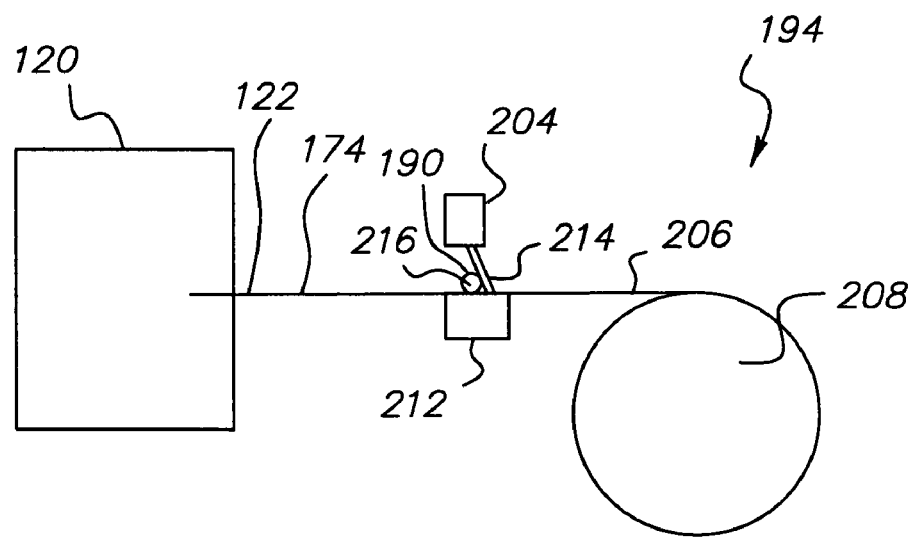
FIG. 27 is a schematic block diagram showing an alternate manufacturing process used to fill channels with an optical material for forming light guides.

In some embodiments, as shown in FIGS. 26 and 27, optical material 190 is introduced into channels 154 on patterned layer 122 using roller pressure. FIG. 26 shows, in schematic form, a coating apparatus 194 for forming light paths 22 using web 174 of patterned layer 122. Web 174 of patterned layer 122 is formed as described above or using some other method, is fed from a source, such as a roll 196. Alternately, as shown in FIG. 27, the source can comprise an extrusion roll molding apparatus 120 used to supply web 174 of patterned layer 122 directly to coating apparatus 194 without intermediate storage of web 174 of patterned layer 122 on roll 196. In this embodiment, optical material 190 is introduced into channels 154 of patterned layer 122 using a coating system such as a cascade coating system.

In the embodiment shown in FIG. 26, web 174 of patterned layer 122 is pulled through a gap 198 between rollers 200 and 202. A source 204 provides a supply of optical material 190 that flows into gap 198. Rollers 200 and 202 apply pressure that forces optical material 190 into channels 154 to form web 206 having optical material 190 in appropriate channels 154. Web 206 is then wrapped onto a receiver roll 208 or stored in some other way. Alternately, web 206 can be further processed in-line, optionally coated or otherwise treated, then cut, folded or otherwise processed to provide a support 20.

Referring to FIG. 27, there is shown another embodiment of a coating apparatus 194 that uses a slightly different technique for filling channels 154 in patterned layer 122. Here, web 174 of patterned layer 122 is passed between coating support 212 and a skiving mechanism 214 that is continuously supplied by source 204 of optical material 190 with a meniscus 216 of optical material 190. This forces optical material 190 into channels 154, forming light paths 22 within channels 154 as web 206 is fed forward and onto receiver roll 208.

Any of a number of other coating techniques known in the art can be used to apply optical material 190 to fill or partially fill channels 154. Specific examples of such other methods include: roll coating and doctor blade coating, gap coating, curtain coating, slot die coating, spraying or printing or using and other coating techniques, some of which are described in greater detail below. Certain of these coating methods are described in greater detail in commonly assigned U.S. patent application Ser. No. 10/411,624 entitled, "Medium Having Data Storage And Communication Capabilities And Method For Forming Same", filed Apr. 11, 2003 in the name of Kerr et al.

Various types of additional coatings can optionally be provided for patterned layer 122 during fabrication, either before or after filling channels 154 with optical material 190. For example, optical coatings could be applied for optimizing reflective response, for improved light absorption, to provide a different index of refraction, or for reducing stray light effects. Other types of coatings could be applied, including protective or adhesive coatings, for example, or coatings that provide spacing distances or suitable mounting surfaces. Coatings could be applied to either or both sides of patterned layer 122, or to any portion thereof, including channels 154 or surrounding structures. For example, a coating could be applied only within one or more channels 154, to provide channels 154 having specific optical properties. Coatings for spacing could be applied at appropriate thicknesses for obtaining the needed distance between adjacent light paths 22 at input 186 and output 188. It would be possible, for example, to vary the coating thickness appropriately between input 186 and output 188 in order to obtain the necessary dimensions. In one embodiment, an output-to-input thickness ratio for an applied coating exceeds about 1.4, for example.

Figure 28:
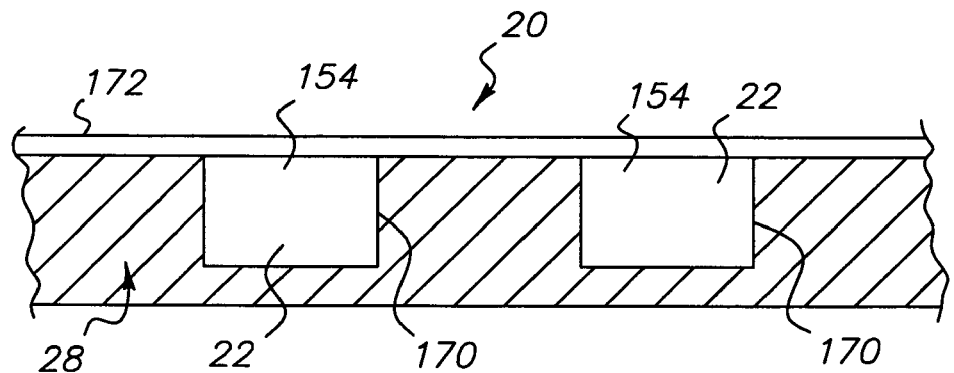
FIG. 28 shows another embodiment of a support.

The methods and apparatuses described above for injection roll molding can also be used to provide light paths 22 in the form of a reflective chamber as is shown in the cross-sectional view of FIG. 28. For such an arrangement, one or more channels 154 are formed having a reflective light surface 170.

An optional reflective covering 172 can then be provided to form a reflective light path 22.

Figure 29:
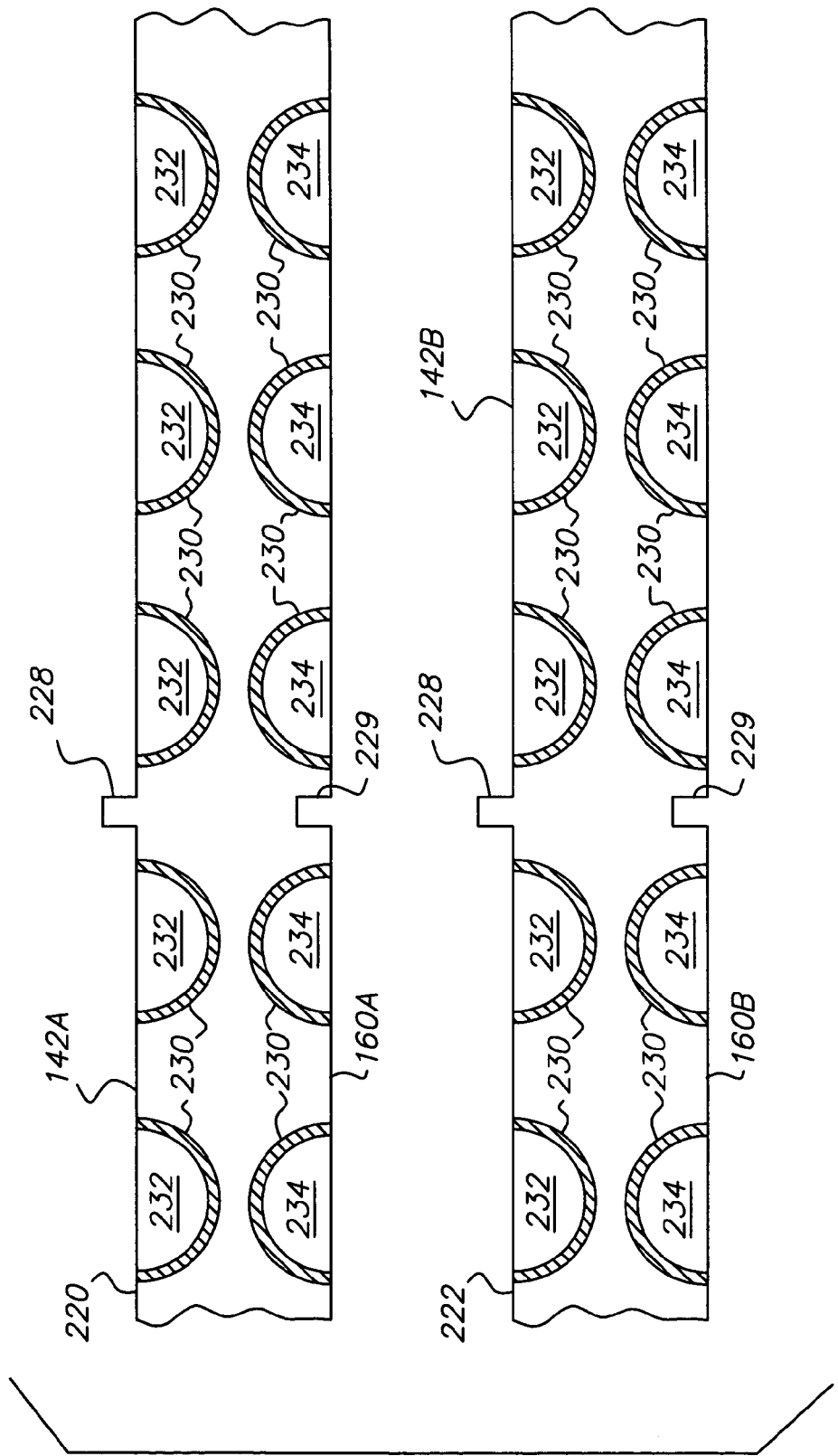
FIG. 29 shows an assembly cross section view of another embodiment of a support.
Figure 30:
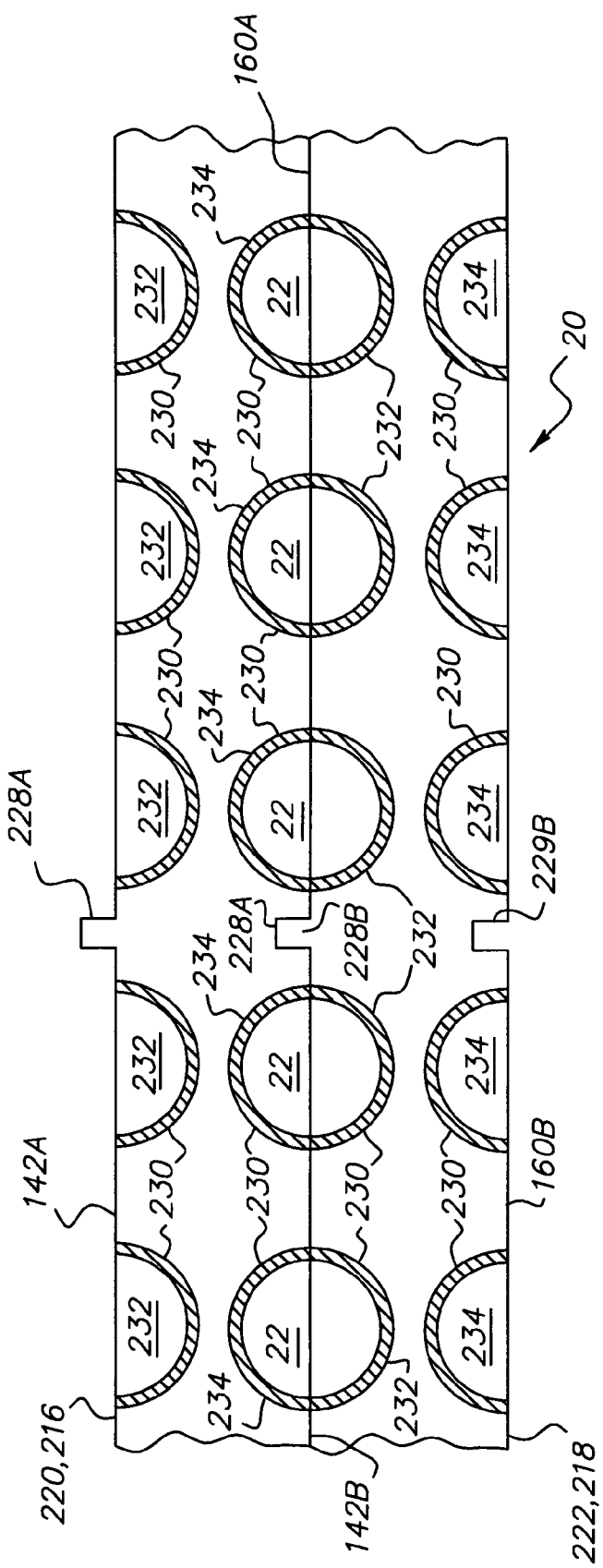
FIG. 30 shows a view of the embodiment of FIG. 22 assembled and in cross section.

Another embodiment of a support 20 in FIGS. 29 and 30 shows respectively an assembly and assembled view of a support 20 that is formed by joining at least two patterned layers 220 and 222. As is shown in FIG. 29, patterned layers 220 and 222 each have a patterned surface 142a and 142b respectively and a patterned base surface 160a and 160b having partial channels 232 and 234 respectively formed therein. Each of these light guides has a reflective cladding 230 coated or otherwise provided along partial channels 232 and 234 to form a reflective surface. In this embodiment, partial channels 232 and 234 are adapted to cooperate to form light paths 22 when a patterned layer 122a and patterned layer 122b are joined together. In this embodiment, each patterned layer 122a and 122b has patterned surfaces 142a and 142b with an alignment surface 228 and a patterned base surfaces 160a and 160b having alignment surface receiving areas 229a and 229b adapted to receive alignment surfaces 228a and 228b and to facilitate alignment of each patterned layer 122a and 122b with respect to each other. In this embodiment, channels 154 can be formed on base surface 160b by forming a pattern on roller support 133 shown in FIGS. 16 and 17 as a pressure roller 134. Although only one such alignment surface 228a-228b and one such alignment surface receiving area 229a-229b are shown for patterned layers 220 and 222, patterns of more than one can be used. FIG. 30 illustrates the two surfaces joined together to form light paths 22.

Figure 31:
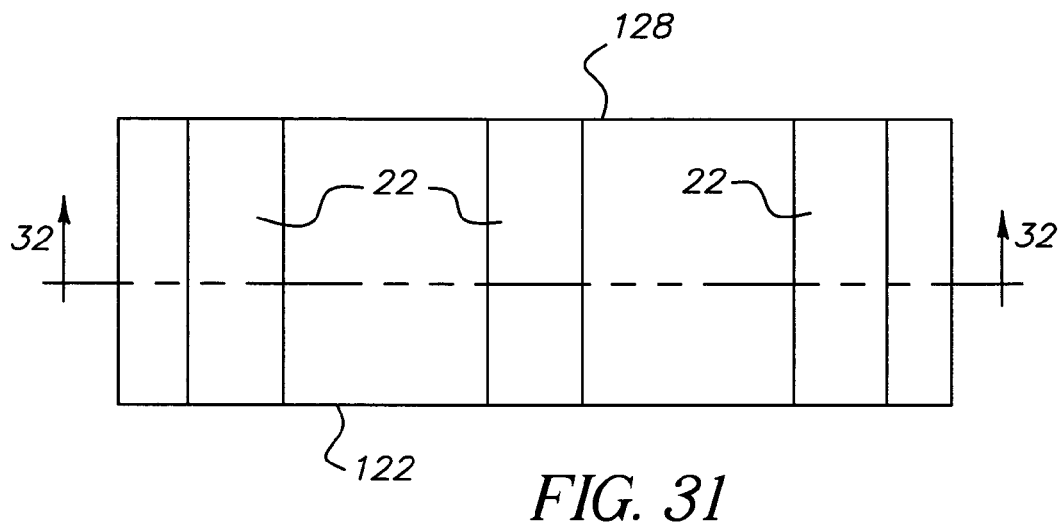
FIG. 31 shows a top view of a patterned layer having light paths in accordance with one embodiment of the invention.
Figure 32:
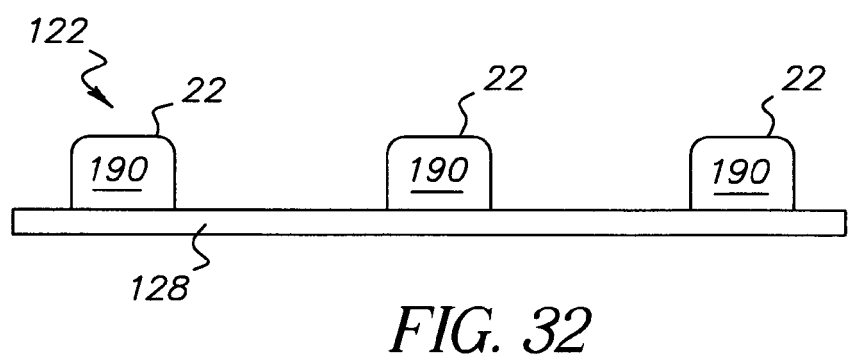
FIG. 32 shows a face view of a substrate of FIG. 31.
Figure 33:
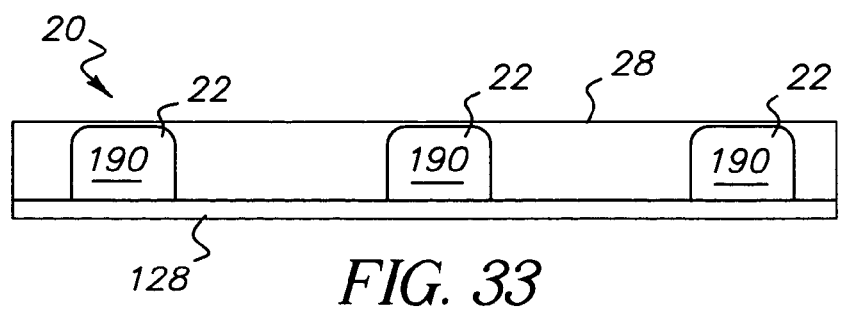
FIG. 33 shows the formation of FIGS. 31 and 32.

It will be appreciated that in yet another alternative embodiment, extrusion roll molding apparatus 120 of FIG. 16 can be used to directly form light paths 22 for support 20 by reversing the process described above and applying a pattern of optical material 190 to a base material 128 using the process described above for applying thermoplastic material 126 to base material 128. This forms a patterned layer 122 having light paths 22 for use in forming a support 20. A top view and cross-section view of such a patterned surface is shown in FIGS. 31 and 32. It will also be appreciated that, in this embodiment, a thermoplastic material 126 or other material can then be applied to a support formed in this fashion using the coating techniques described herein or otherwise known in the art to apply a coating of a thermoplastic material 126 or other suitable support base material 128 to form support 20 having light paths 22 therein, as shown in FIG. 33.

The invention has been described in detail with particular reference to certain preferred embodiments thereof, but it will be understood that variations and modifications can be effected within the spirit and scope of the invention.

The invention claimed is:

1. A display comprising:
   a substrate having an image-forming area;
   an array of individually controllable image-forming elements arranged on the image-forming area; and
   a support located proximate to the substrate, the support having an arrangement of light paths formed therein to transmit light across the image-forming area from a light source external to the image-forming area to a light sensor external to the image-forming area, said light paths being arranged in an area that is, at least in part, co-extensive with the array, said support being elastically deformable so that an application of force to the support causes the light paths to deform in a manner that reduces the portion of light passing through light paths that are elastically deformed by the application of force.

2. The display of claim 1, wherein the individually controllable image-forming elements are adapted to radiate light.

3. The display of claim 1, wherein the light source comprises at least one light-emitting element.

4. The display of claim 1, wherein a matrix of individually controllable light-emitting elements is provided and wherein the array comprises a first portion of the individually controllable light-emitting elements of the matrix and wherein the light source comprises a second portion of the individually controllable light-emitting elements of the matrix.

5. The display of claim 4, wherein individually controllable light-emitting elements of the first portion and the second portion are interspersed within the matrix.

6. The display of claim 1, wherein the light source comprises more than one individually controllable light-emitting element and different sets of the light paths associated with different ones of the more than one light-emitting element.

7. The display of claim 6, further comprising a control circuit for sequentially activating each of the more than one individually controllable light-emitting element.

8. The display claim 6, wherein at least two of the individually controllable light-emitting elements radiate a different type of light.

9. The display of claim 6, further comprising a control circuit for activating the light sources associated with different ones of the light paths in a predetermined temporal pattern and for using the predetermined pattern for filtering an output from the light sensor to discriminate light that has passed through different ones of the sets of light paths.

10. The display of claim 1, wherein the light sensor comprises more than one light sensitive area each area providing a separate signal indicating an amount of light incident thereupon and wherein different sets of the light paths are associated with different ones of the more than one light sensitive area.

11. The display of claim 1, wherein the light source comprises a source of non-visible light and wherein the light sensor is adapted to sense the non-visible light.

12. The display of claim 1, wherein the light paths form two patterns of light paths in a common plane, and wherein the two patterns arranged to at least partially intersect in a common area.

13. The display of claim 1, wherein the light paths form two patterns of light paths arranged in separate planes to at least partially overlap.

14. The display of claim 1, further comprising a control circuit adapted to activate the light source, to receive a signal from the light sensor representative of an amount of light incident upon the light sensor, and to determine from the light sensor signal when at least one of the light paths has been deformed.

15. The display of claim 1, wherein the individual light-emitting elements and the light source, are formed from organic light-emitting diodes.

16. The display of claim 1, wherein at least one of the light source, light-emitting elements, and light sensor are formed on the support.

17. The display of claim 16, further comprising a control circuit formed on the support.

18. The display of claim 1, wherein the light sensor is a non-organic light-detecting element.

19. The display of claim 1, wherein the light sensor is a silicon light-detecting element.

20. The display of claim 1, wherein the light sensor is a silicon light-detecting element formed in a thin film.

21. The display of claim 1, wherein the light sensor is an organic light sensor.

22. The display of claim 1, wherein said support is elastically deformable so that the application of force to the support causes the support to deform in a manner that reduces the portion of light passing through light paths in proportion to the amount of force applied.

23. The display of claim 1, wherein the light sensor provides an output signal that is in proportion to the amount of light received thereby.

24. The display of claim 1, wherein said support is elastically deformable so that the application of a first level of force to the support causes deformation in an area in which the force is applied that elastically alters the light paths in the force applied area to reduce the portion of light passing through the light paths in the force applied area to a first range.

25. The display of claim 24, wherein said support is further elastically deformable so that the application of a second level of force greater than the first level of support causes deformation in the force applied area that further alters the light paths in the force applied area to further reduce the portion of light passing through the light paths in the force applied area to a second range.

26. The display of claim 25, wherein the first range of portions and second range of portions are non-contiguous.

27. The display of claim 25, wherein the support and substrate comprise the same structure.

28. The display of claim 1, wherein the support comprises a first layer having a pattern of channels therein and a second layer sealing the channels.

29. The display of claim 28, wherein the channels are shaped for high efficiency transmission of light and wherein deformation of the support reduces the efficiency of light transmission therebetween.

30. A display comprising:
   a substrate layer having an image-forming area;
   a light-emitting and light-sensing layer formed on the substrate layer, the light-emitting and sensing layer having a plurality of individually controllable light emitters external to the image-forming area some of the light emitters being patterned in an array to form a display area and some of the light emitters being patterned for use as a light source with the light-emitting and sensing layer further comprising a plurality of individually addressable light sensors external to the image-forming area; and
   an elastically deformable layer having a plurality of light path channels therein, each adapted to convey at least a portion of the light from one of the light emitters of the light source to one of the light sensors, said elastically deformable layer further being adapted to change the amount of light transmitted in response to deformation.

31. The display of claim 30, wherein the light-emitting and light-sensing layer is formed on one side of the substrate layer, with the elastically deformable layer being formed on another side of the substrate layer and with the substrate layer providing light channels defining a light travel path between the light source and the light sensor associated therewith.

32. The display of claim 30, further comprising a layer encapsulating the light-emitting and light-sensing layer, said layer being substantially transparent.

33. The display of claim 32, wherein the elastically deformable layer further encapsulates the substrate.

34. The display of claim 30, further comprising an intensity control circuit adapted to control the intensity of light emitted by the light-emitting elements and to sense the amount of light traveling to the light sensors so that the display elements modify the amount of light emitted by light-emitting elements that do not provide light to light pipes.

* * * * *